US010872155B2

(12) United States Patent
Oh et al.

(10) Patent No.: US 10,872,155 B2
(45) Date of Patent: Dec. 22, 2020

(54) COMPUTING SYSTEM FOR MANAGING FIRMWARE AND FIRMWARE MANAGING METHOD THEREOF

(71) Applicant: SAMSUNG ELECTRONICS CO., LTD., Suwon-si (KR)

(72) Inventors: Youngdae Oh, Suwon-si (KR); Bogyeong Kang, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 422 days.

(21) Appl. No.: 15/812,362

(22) Filed: Nov. 14, 2017

(65) Prior Publication Data

US 2018/0137284 A1 May 17, 2018

(30) Foreign Application Priority Data

Nov. 16, 2016 (KR) ........................ 10-2016-0152821
Feb. 28, 2017 (KR) ........................ 10-2017-0026424

(51) Int. Cl.
*G06F 21/57* (2013.01)
*G06F 21/64* (2013.01)
*H04L 29/06* (2006.01)
*H04L 9/32* (2006.01)
*H04L 9/30* (2006.01)
(Continued)

(52) U.S. Cl.
CPC ............ *G06F 21/572* (2013.01); *G06F 8/654* (2018.02); *G06F 21/64* (2013.01); *H04L 9/006* (2013.01); *H04L 9/0877* (2013.01); *H04L 9/30* (2013.01); *H04L 9/3236* (2013.01); *H04L 9/3247* (2013.01); *H04L 63/12* (2013.01)

(58) Field of Classification Search
CPC ........ G06F 8/654; G06F 21/572; G06F 21/64; H04L 9/006; H04L 9/0877; H04L 63/12; H04L 9/3247; H04L 9/30; H04L 9/3236
USPC ......................................................... 726/26
See application file for complete search history.

(56) References Cited

U.S. PATENT DOCUMENTS 7,069,452 B1 * 6/2006 Hind ..................... G06F 21/572
713/1
2002/0091651 A1 * 7/2002 Petrogiannis ........... G06F 21/64
705/76

(Continued)

*Primary Examiner* — Kambiz Zand
*Assistant Examiner* — Benjamin A Kaplan
(74) *Attorney, Agent, or Firm* — F. Chau & Associates, LLC

(57) ABSTRACT

A firmware managing method of a computing system includes receiving a first firmware image, a second firmware image, first model information of a first electronic device corresponding to the first firmware image, and second model information of a second electronic device corresponding to the second firmware image, selecting a first codesigner version using the first model information and a second codesigner version using the second model information, sending the first firmware image and the second firmware image to a hardware security module, receiving a first signature generated using the first firmware image and a second signature generated using the second firmware image, and generating a signed first firmware image, in which the first signature and the first firmware image are combined, using the first codesigner version and generating a signed second firmware image, in which the second signature and the second firmware image are combined, using the second codesigner version.

20 Claims, 19 Drawing Sheets

(51) Int. Cl.
*G06F 8/654* (2018.01)
*H04L 9/08* (2006.01)
*H04L 9/00* (2006.01)

(56) References Cited

U.S. PATENT DOCUMENTS

| | | | | |
|---|---|---|---|---|
| 2009/0172639 A1* | 7/2009 | Natu | ............... | G06F 21/57 |
| | | | | 717/120 |
| 2011/0307712 A1* | 12/2011 | Sakthikumar | ......... | G06F 21/572 |
| | | | | 713/189 |
| 2012/0260082 A1* | 10/2012 | Bobzin | ............... | G06F 21/572 |
| | | | | 713/100 |
| 2016/0378990 A1* | 12/2016 | Goodman | ............ | G06F 21/572 |
| | | | | 726/19 |
| 2017/0201380 A1* | 7/2017 | Schaap | ............... | H04L 63/061 |
| 2018/0075242 A1* | 3/2018 | Khatri | ............... | G06F 21/575 |

* cited by examiner

COMPUTING SYSTEM FOR MANAGING FIRMWARE AND FIRMWARE MANAGING METHOD THEREOF

CROSS-REFERENCE TO RELATED APPLICATIONS

This application claims priority under 35 U.S.C. § 119 to Korean Patent Application Nos. 10-2016-0152821, filed Nov. 16, 2016, and 10-2017-0026424, filed Feb. 28, 2017, in the Korean Intellectual Property Office, the disclosures of which are incorporated by reference herein in their entireties.

TECHNICAL FIELD

Exemplary embodiments of the inventive concept described herein relate to a computing system, and more particularly, relate to a computing system for managing firmware and a firmware managing method thereof.

DISCUSSION OF RELATED ART

Some devices including electronic systems may be driven through firmware, which is independent of an application program or an operating system. The firmware may be updated with new versions for stable performance and bug fixes even after product launch. Nowadays, as security attacks on devices increase and grow more sophisticated, security for firmware may also need to be enhanced.

Encryption of a firmware image may be required to update the firmware of the electronic system. A hardware security module may be used to encrypt the firmware image. The hardware security module may generate a public key and a private key and may store the private key therein to prevent the private key from being leaked to the outside. Accordingly, security may be increased when the firmware image is encrypted by using the hardware security module.

SUMMARY

According to an exemplary embodiment of the inventive concept, a firmware managing method of a computing system includes receiving a first firmware image, a second firmware image, first model information of a first electronic device corresponding to the first firmware image, and second model information of a second electronic device corresponding to the second firmware image, selecting a first codesigner version among a plurality of codesigner versions using the first model information and selecting a second codesigner version among the plurality of codesigner versions using the second model information, sending the first firmware image and the second firmware image to an external hardware security module, receiving, from the external hardware security module, a first signature that is generated using the first firmware image and a second signature that is generated using the second firmware image, and generating a signed first firmware image, in which the first signature and the first firmware image are combined, using the first codesigner version and generating a signed second firmware image, in which the second signature and the second firmware image are combined, using the second codesigner version.

According to an exemplary embodiment of the inventive concept, a computing system includes a processor and a memory. The processor selects a first codesigner version among a plurality of codesigner versions using model information of an electronic device, receives a signature, which is generated using a firmware image, from an external hardware security module, and generates a signed firmware image by combining the received signature and the firmware image using the selected first codesigner version. The memory stores the plurality of codesigner versions.

According to an exemplary embodiment of the inventive concept, a firmware update system includes a computing system and a hardware security module. The computing system includes a memory and a processor including a signed firmware generation unit. The hardware security module includes a signature generation unit and a security storage. The computing system is configured to receive a first firmware image from a user of a first electronic device and transmit the first firmware image to the signature generation unit. The signature generation unit is configured to read a first private key of the first firmware image from the security storage, generate a first hash value from the first firmware image, generate a first signature using the first hash value and the first private key, and transmit the first signature to the signed firmware generation unit, The signed firmware generation unit is configured to receive the first signature, receive first model information of the first electronic device from the user, select a first codesigner version from a plurality of codesigner versions stored in the memory using the first model information, combine the first firmware image and the first signature using the selected first codesigner version to generate a first signed firmware image, and transmit the first signed firmware image to the user.

BRIEF DESCRIPTION OF THE DRAWINGS

The above and other objects and features of the inventive concept will become apparent by describing in detail exemplary embodiments thereof with reference to the accompanying drawings.

DETAILED DESCRIPTION OF THE EMBODIMENTS

Figure 1:
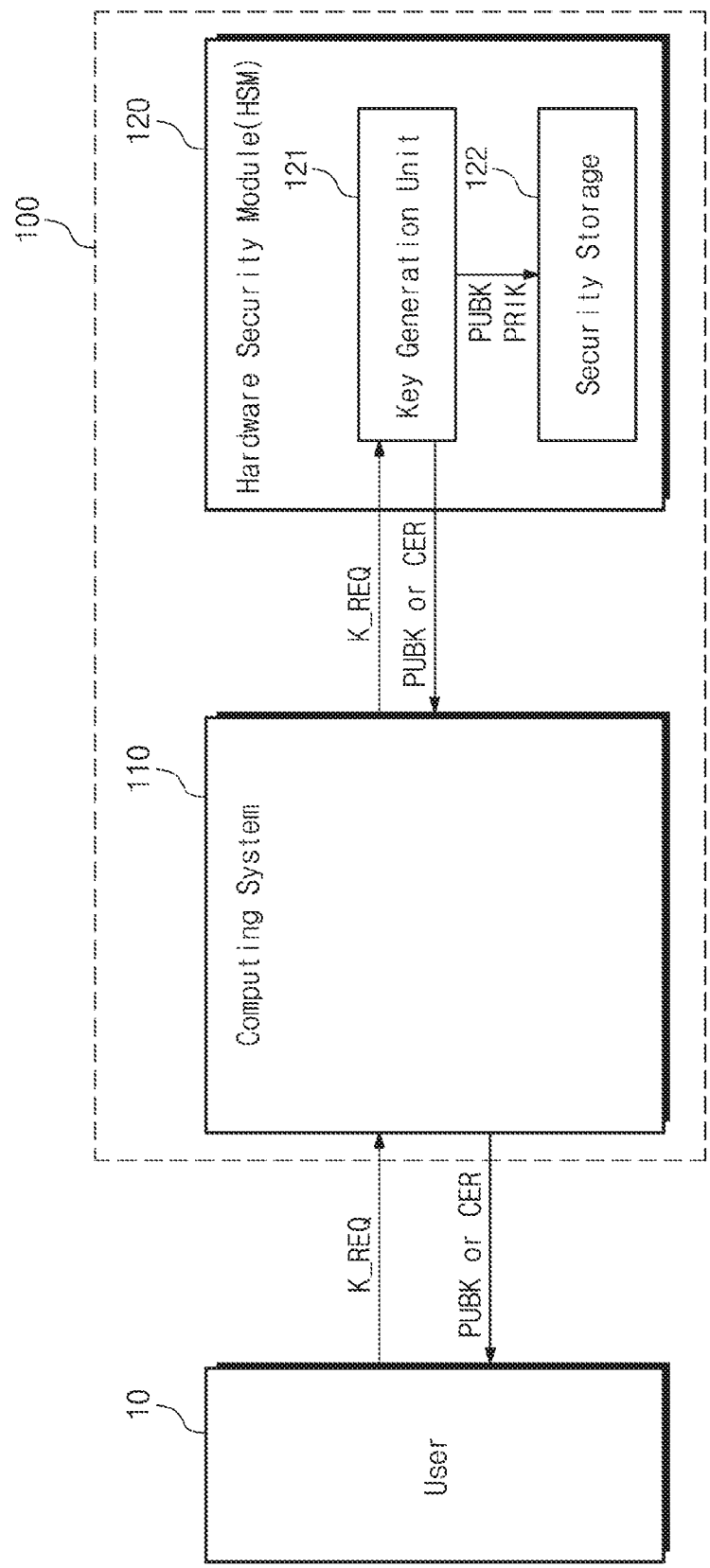
FIG. 1 is a block diagram illustrating a firmware update system that communicates with a user to generate a key, according to an exemplary embodiment of the inventive concept.

Exemplary embodiments of the inventive concept will be described in detail hereinafter with reference to the accompanying drawings. Like reference numerals may refer to like elements throughout this application.

Exemplary embodiments of the inventive concept provide a computing system for providing high security and reliability of firmware by using a hardware security module and a firmware managing method thereof.

FIG. 1 is a block diagram illustrating a firmware update system that communicates with a user to generate a key, according to an exemplary embodiment of the inventive concept. Referring to FIG. 1, a firmware update system 100 may include a computing system 110 and a hardware security module (HSM) 120.

The computing system 110 may communicate with a user 10. The computing system 110 may receive a key request K_REQ from the user 10. A user key may be generated according to the key request K_REQ. For example, the user key may include a public key PUBK and a private key PRIK. For example, the user 10 may be an engineer that has the authority to design and update a firmware image. The computing system 110 may send the key request K_REQ received from the user 10 to the hardware security module 120. For example, the computing system 110 may be implemented with one of a desktop computer, a laptop computer, a workstation, or a server system.

The hardware security module 120 may receive the key request K_REQ from the computing system 110. The hardware security module 120 may include a key generation unit 121 and a security storage 122. The key generation unit 121 may generate the public key PUBK and the private key PRIK based on the key request K_REQ. The public key PUBK and the private key PRIK may be generated by a key generation algorithm of the key generation unit 121.

The key generation unit 121 may be implemented with a hardware intellectual property (IP) for driving the key generation algorithm. Alternatively, the key generation unit 121 may be implemented with a software module that is driven according to the key generation algorithm in the hardware security module 120. The key generation unit 121 may send the generated public key PUBK to the computing system 110. The key generation unit 121 may store the generated public key PUBK and the generated private key PRIK in the security storage 122.

Alternatively, the key generation unit 121 may generate a certificate CER that is based on the public key PUBK. The certificate CER may include the public key PUBK and may include information about a booting count of a signature that is generated based on the private key PRIK.

The security storage 122 may be a memory for storing the public key PUBK and the private key PRIK. The private key PRIK used in execution of a signature algorithm may be protected against an external connection. To this end, the public key PUBK and the private key PRIK may be stored in the security storage 122 having a security function that makes it difficult for an external device to freely access the security storage 122.

The computing system 110 may transmit the received public key PUBK or the received certificate CER to the user 10. The user 10 may store the received public key PUBK or the received certificate CER in a specific area of an electronic device. The electronic device may drive various application programs for, e.g., electronic payment, a map, a camera, multimedia play, Internet access, file sharing using short range communication, etc. In addition, the electronic device may be driven like hardware, which is independent of an application program, through firmware. Firmware stored in a storage area of the electronic device may be updated with new versions for stable performance and bug fixes even after product launch. Firmware updates of the electronic device may be performed by using a signed firmware image S_FIMG. This will be more fully described with reference to FIG. 3.

One user 10 is illustrated in FIG. 1, but the number of users may be greater than one. In the case where the number of users is greater than one, the firmware update system 100 may generate the public key PUBK and the private key PRIK of each user. The firmware update system 100 may provide a service for managing the public key PUBK and the private key PRIK of each user. This will be more fully described with reference to FIG. 2.

Figure 2:
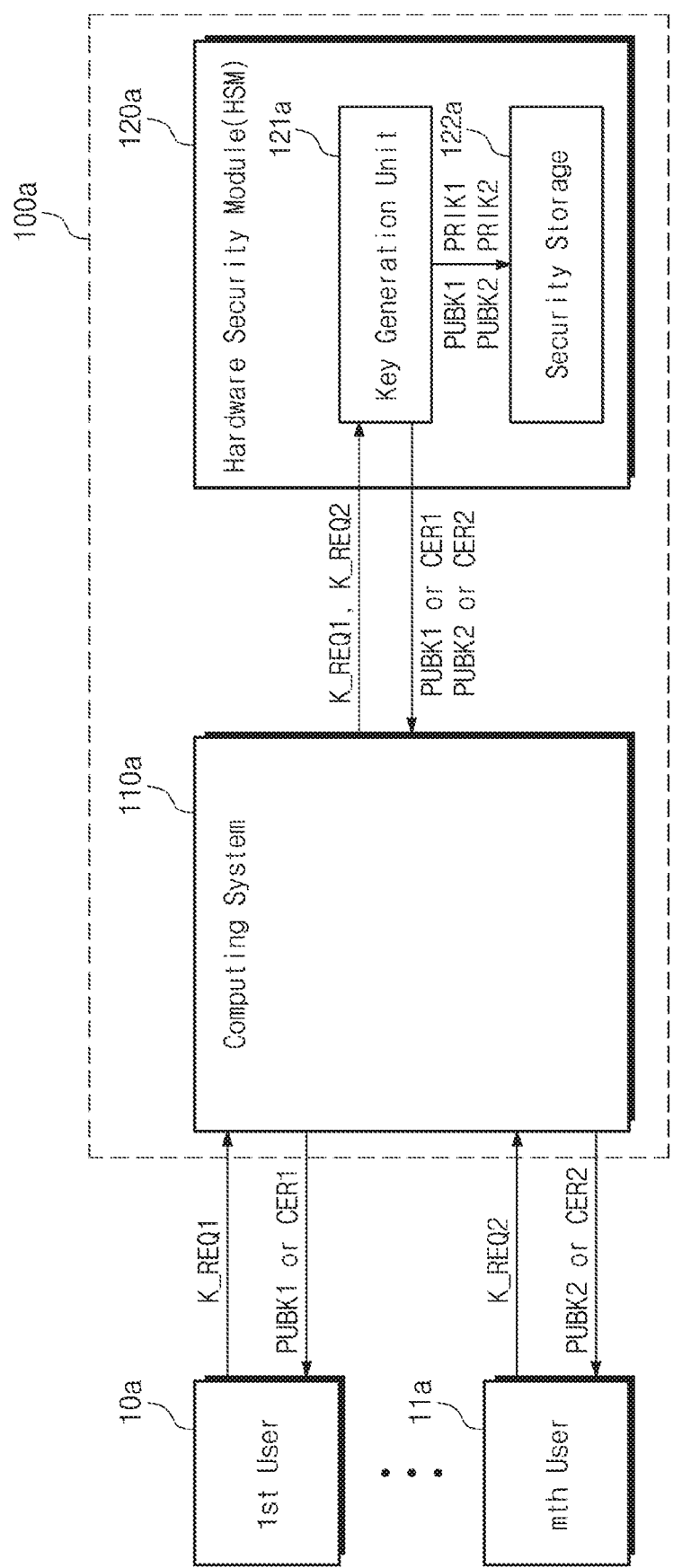
FIG. 2 is a block diagram illustrating a firmware update system that generates a key for each user, according to an exemplary embodiment of the inventive concept.

FIG. 2 is a block diagram illustrating a firmware update system that generates a key for each user, according to an exemplary embodiment of the inventive concept. Referring to FIG. 2, a firmware update system 100a may include a computing system 110a and a hardware security module 120a. The firmware update system 100a illustrated in FIG. 2 is similar to or the same as the firmware update system 100 illustrated in FIG. 1. However, the firmware update system 100a of FIG. 2 may receive key requests K_REQ1 and K_REQ2 from a plurality of users 10a and 11a, respectively. The plurality of users 10a and 11a may include a first user 10a and an m-th user 11a. The plurality of users 10a and 11a may include more than two users, and each user may transmit a key request to the firmware update system 100a.

The computing system 110a may send the received key requests K_REQ1 and K_REQ2 to the hardware security module 120a.

The hardware security module 120a may receive the key requests K_REQ1 and K_REQ2 from the computing system 110a. The hardware security module 120a may include a key generation unit 121a and security storage 122a. The key generation unit 121a may generate the public key PUBK and the private key PRIK for the first user 10a and the m-th user 11a based on the key requests K_REQ1 and K_REQ2. In more detail, the key generation unit 121a may generate a first public key PUBK1 and a first private key PRIK1 for the first user 10a based on the first key request K_REQ1. The key generation unit 121a may also generate a second public key PUBK2 and a second private key PRIK2 for the m-th user 11a based on the second key request K_REQ2. For example, a key generation algorithm for generating the first public key PUBK1 and the first private key PRIK1 may be different from a key generation algorithm for generating the second public key PUBK2 and the second private key PRIK2.

The key generation unit 121a may provide the computing system 110a with the first and second public keys PUBK1 and PUBK2. The key generation unit 121a may store the first and second public keys PUBK1 and PUBK2 and the first and second private keys PRIK1 and PRIK2 in the security storage 122a. The key generation unit 121a may also generate a first certificate CER1 based on the first public key PUBK1 and a second certificate CER2 based on the second public key PUBK2. The security storage 122a may be a memory that stores the first and second public keys PUBK1 and PUBK2 and the first and second private keys PRIK1 and PRIK2. The security storage 122a may have a security function that makes it difficult for an external device to freely access the security storage 122a.

The computing system 110a may transmit the first public key PUBK1 or the first certificate CER1 to the first user 10a. The computing system 110a may transmit the second public key PUBK2 or the second certificate CER2 to the m-th user 11a. The first user 10a and the m-th user 11a may store the first public key PUBK1 or the first certificate CER1 and the second public key PUBK2 or the second certificate CER2 in different electronic devices.

FIGS. 1 and 2 describe a technology for generating one public key PUBK and one private key PRIK per user. However, the inventive concept is not limited thereto. For example, one user may generate a plurality of public keys PUBK and a plurality of private keys PRIK. This will be more fully described with reference to FIG. 3.

Figure 3:
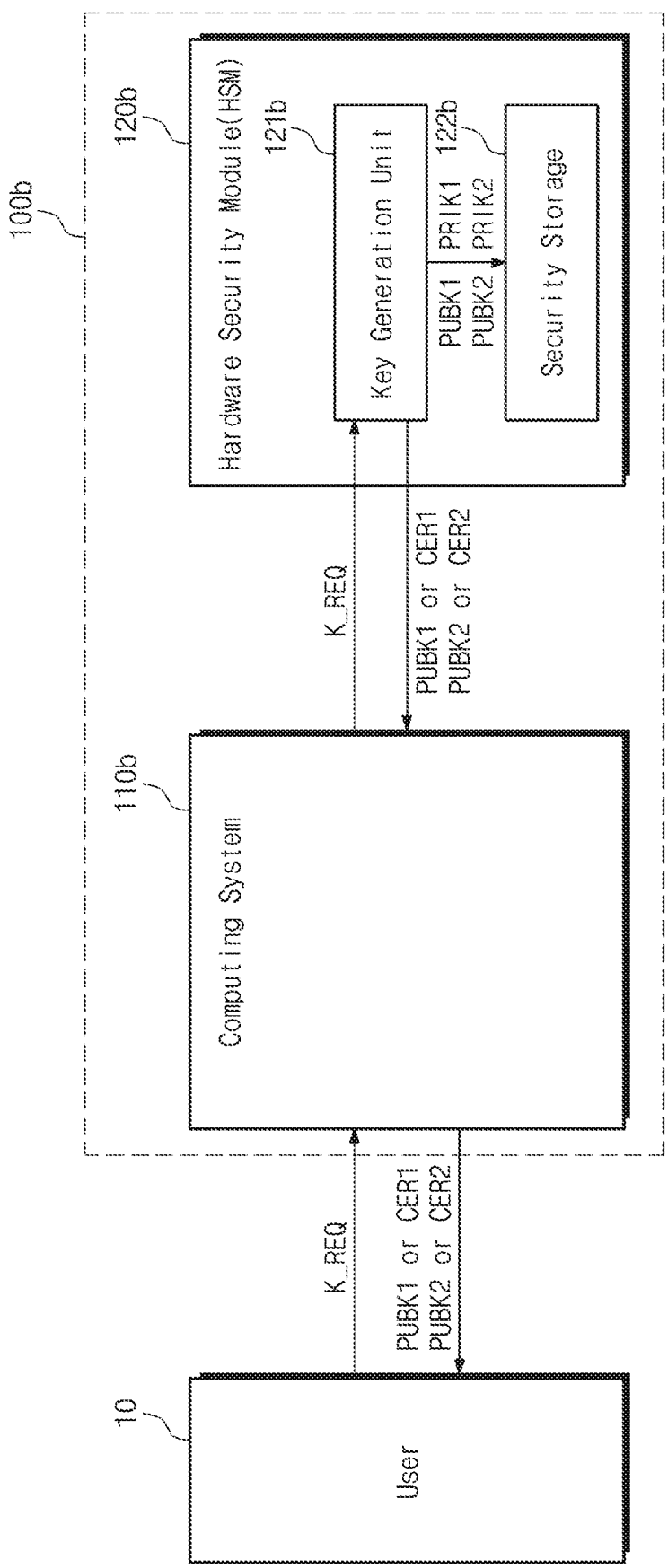
FIG. 3 is a block diagram illustrating a firmware update system that generates a plurality of keys for each user, according to an exemplary embodiment of the inventive concept.

FIG. 3 is a block diagram illustrating a firmware update system that generates a plurality of keys for each user, according to an exemplary embodiment of the inventive concept. Referring to FIG. 3, a firmware update system 100b may include a computing system 110b and a hardware security module 120b. The firmware update system 100b illustrated in FIG. 3 is similar to or the same as the firmware update system 100 illustrated in FIG. 1. However, the firmware update system 100b in FIG. 3 may generate a plurality of public keys (e.g., the first public key PUBK1 and the second public key PUBK2) and a plurality of private keys (e.g., the first private key PRIK1 and the second private key PRIK2) with respect to one user 10.

In more detail, the computing system 110b may receive the key request K_REQ from the user 10. The computing system 110a may send the received key request K_REQ to the hardware security module 120b.

The hardware security module 120b may receive the key request K_REQ from the computing system 110b. The hardware security module 120b may include a key generation unit 121b and a security storage 122b. The key generation unit 121b may generate the public key PUBK and the private key PRIK with respect to the user 10 based on the key request K_REQ. In more detail, the key generation unit 121b may generate the first public key PUBK1 and the first private key PRIK1 with respect to the user 10 based on the key request K_REQ and may also generate the second public key PUBK2 and the second private key PRIK2 with respect to the user 10 based on the key request K_REQ. For example, a key generation algorithm for generating the first public key PUBK1 and the first private key PRIK1 may be different from a key generation algorithm for generating the second public key PUBK2 and the second private key PRIK2.

The key generation unit 121b may provide the computing system 110b with the first and second public keys PUBK1 and PUBK2. The key generation unit 121b may store the first and second public keys PUBK1 and PUBK2 and the first and second private keys PRIK1 and PRIK2 in the security storage 122b. Additionally, the key generation unit 121a may generate the first certificate CER1 based on the first public key PUBK1 and may generate the second certificate CER2 based on the second public key PUBK2. The security storage 122b may be a memory that stores the first and second public keys PUBK1 and PUBK2 and the first and second private keys PRIK1 and PRIK2. The security storage 122b may have a security function that makes it difficult for an external device to freely access the security storage 122b.

The computing system 110a may transmit the first public key PUBK1 or the first certificate CER1 and the second public key PUBK2 or the second certificate CER2 to the user 10. The user 10 may store the first public key PUBK1 or the first certificate CER1 and the second public key PUBK2 or the second certificate CER2 in different electronic devices.

Figure 4:
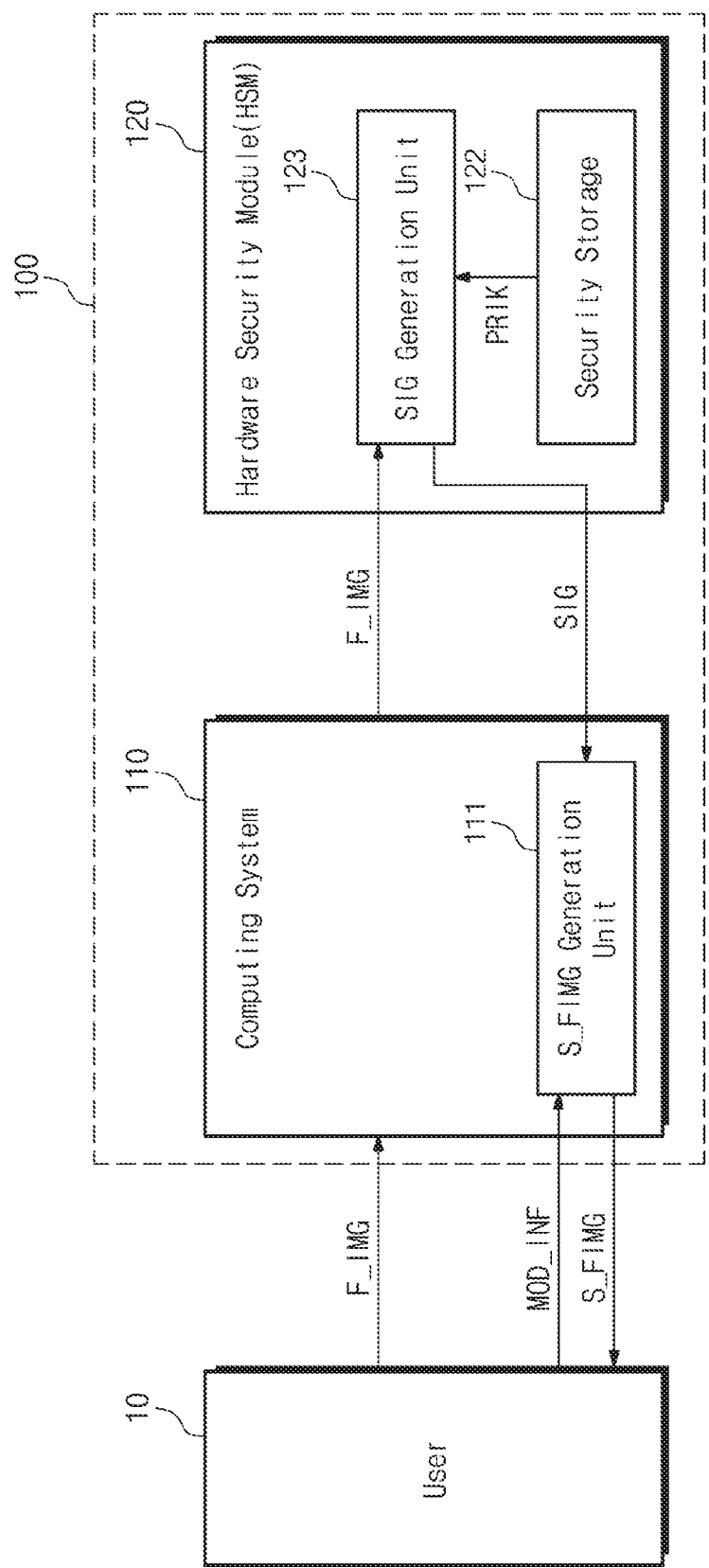
FIG. 4 is a block diagram illustrating the firmware update system of FIG. 1 that communicates with the user to generate a signed firmware image, according to an exemplary embodiment of the inventive concept.

FIG. 4 is a block diagram illustrating the firmware update system of FIG. 1 that communicates with the user to generate a signed firmware image, according to an exemplary embodiment of the inventive concept. Referring to FIGS. 1 and 4, the computing system 110 may be provided with a firmware image F_IMG and model information MOD_INF from the user 10. The model information MOD_INF may be product information of an electronic device in which the public key PUBK is stored. The computing system 110 may send the firmware image F_IMG to the hardware security module 120 to generate a signature SIG.

The hardware security module 120 may include a signature generation unit 123 for generating the signature SIG based on the firmware image F_IMG. The hardware security module 120 may read the private key PRIK of the received firmware image F_IMG from the security storage 122. The hardware security module 120 may generate a hash value from the firmware image F_IMG.

The hardware security module 120 may generate the signature SIG through a signature generation algorithm. The signature SIG may be generated based on the hash value and the private key PRIK. The signature generation unit 123 may be implemented with a hardware intellectual property (IP) for driving the signature generation algorithm. Alternatively, the signature generation unit 123 may be implemented with a software module that is driven according to the signature generation algorithm in the hardware security module 120. The hardware security module 120 may send the generated signature SIG to the computing system 110.

A signed firmware image generation unit 111 of the computing system 110 may receive the signature SIG from the hardware security module 120. The signed firmware image generation unit 111 may also receive the model information MOD_INF from the user 10. The signed firmware image generation unit 111 may select a codesigner (e.g., a codesigner version) based on the model information MOD_INF.

The codesigner may combine the firmware image F_IMG and the signature SIG based on a codesigner algorithm. In other words, the signed firmware image generation unit 111 may combine the firmware image F_IMG and the signature SIG based on the selected codesigner. The signed firmware image generation unit 111 may generate a signed firmware image S_FIMG by combining the firmware image F_IMG and the signature SIG based on the selected codesigner.

The signed firmware image generation unit 111 may be implemented with a hardware intellectual property (IP) for driving the codesigner algorithm. Alternatively, the signed firmware image generation unit 111 may be implemented with a software module that is driven according to the codesigner algorithm in the hardware security module 120. The computing system 110 may transmit the signed firmware image S_FIMG to the user 10.

However, the inventive concept is not limited thereto. Referring to FIGS. 2 to 4, the firmware update system 100a/100 may receive a firmware image from each of the plurality of users 10a and 11a and may generate a signed firmware image with respect to each of the plurality of users 10a and 11a. Alternatively, the firmware update system 100/100b may receive a plurality of firmware images for different electronic devices from the user 10 and may generate a signed firmware image with respect to each of the plurality of firmware images. A method in which the firmware update system 100/100a/100b generates the signed firmware image S_FIMG will be described with reference to FIGS. 9 to 13.

Figure 5:
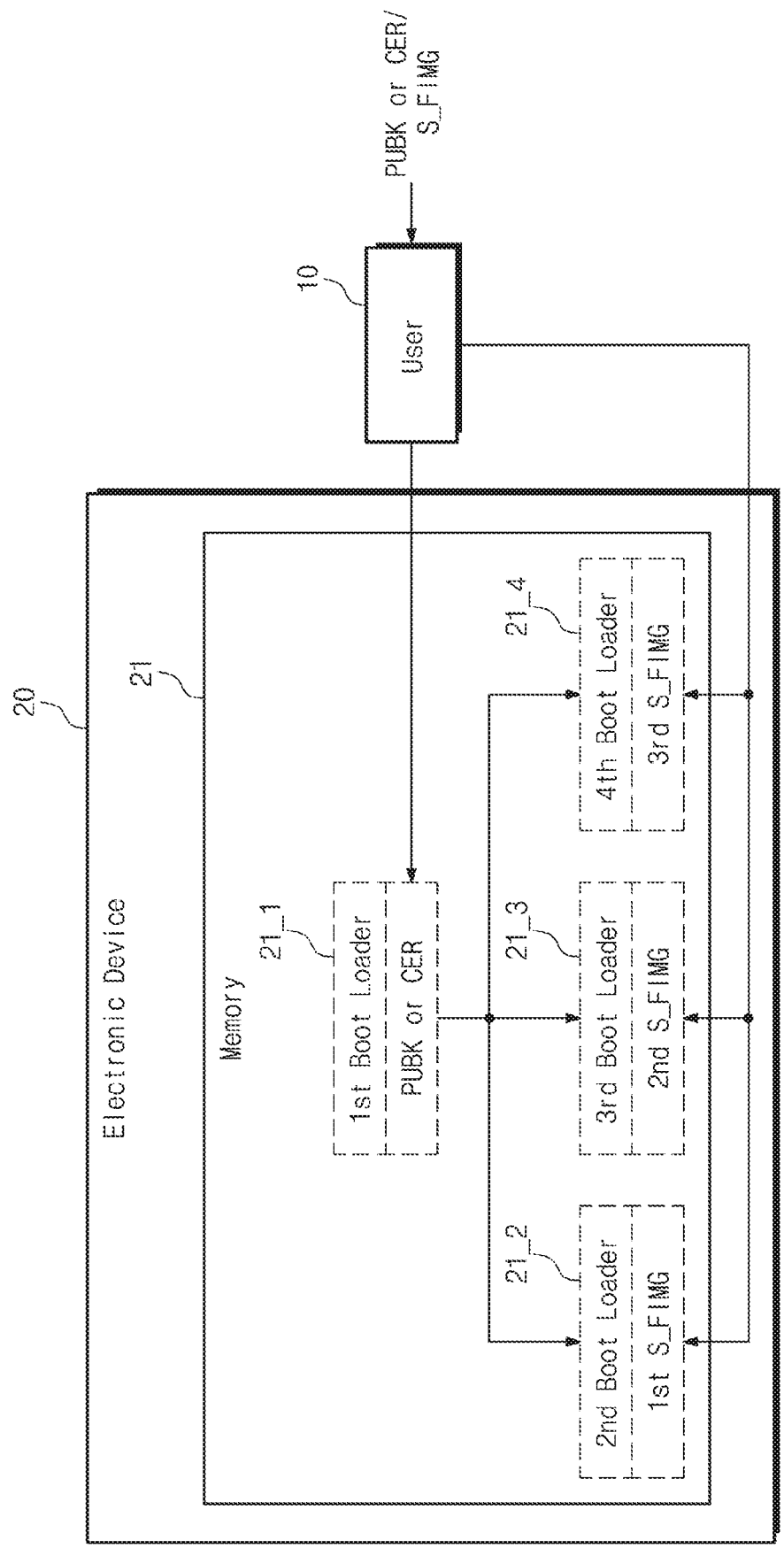
FIG. 5 is a block diagram illustrating a firmware update method of an electronic device, according to an exemplary embodiment of the inventive concept.

FIG. 5 is a block diagram illustrating a firmware update method of an electronic device, according to an exemplary embodiment of the inventive concept. Referring to FIGS. 1, 2, and 5, the user 10 may receive the public key PUBK or the certificate CER from the computing system 110. The public key PUBK or the certificate CER may be stored in a memory 21 of an electronic device 20. For example, the memory 21 may be implemented with memory cards such as a compact flash card (CF), a smart media card, a memory stick, a multimedia card (MMC) (Reduced-Size MMC (RS-MMC) or MMCmicro), a secure digital card (SD, miniSD, microSD, or SD High Capacity (SDHC)), a universal serial bus (USB) memory card, universal flash storage (UFS), or an embedded MMC (eMMC).

The public key PUBK or the certificate CER may be stored in the memory 21 by the user 10. Alternatively, the public key PUBK or the certificate CER may be provided to a manufacturer of the memory 21, and the manufacturer may store the public key PUBK or the certificate CER in the memory 21 during the process of manufacturing the memory 21. The public key PUBK or the certificate CER may be stored in a first boot loader 21_1 of the memory 21.

The user 10 may also receive the signed firmware image S_FIMG from the computing system 110. The user 10 may store the signed firmware image S_FIMG in the memory 21 of the electronic device 20. The signed firmware image S_FIMG may be updated with one of second to fourth boot loaders 21_2 to 21_4 of the memory 21. For example, in the case where there is a firmware image, which needs an update, from among firmware images included in the second to fourth boot loaders 21_2 to 21_4 of the memory 21, the user 10 may sign a new firmware image through the firmware update system 100. The user 10 may update the signed firmware image S_FIMG with one of the second to fourth boot loaders 21_2 to 21_4. For example, it is assumed here that the user 10 updates the signed firmware image S_FIMG in the second boot loader 21_2.

In the case where the public key PUBK is stored in the first boot loader 21_1, the signed firmware image S_FIMG of the second boot loader 21_2 may be authenticated based on the public key PUBK. In more detail, the electronic device 20 may verify the signature SIG included in the signed firmware image S_FIMG, based on the public key PUBK. In the case where the certificate CER is stored in the first boot loader 21_1, the number of times that the signed firmware image S_FIMG updated in the second boot loader 21_2 is booted may be limited according to the certificate CER.

In the case where a verification result indicates that a defect exists in the signed firmware image S_FIMG or authentication fails, the electronic device 20 may provide a verify fail message to the user 10. In this case, the user 10 may discard the signed firmware image S_FIMG or may make a request to the firmware update system 100 for the signature SIG of a new firmware image. In contrast, in the case where verification of the signed firmware image S_FIMG is passed from the electronic device 20, a booting procedure of the second boot loader 21_2 may progress.

Figure 6:
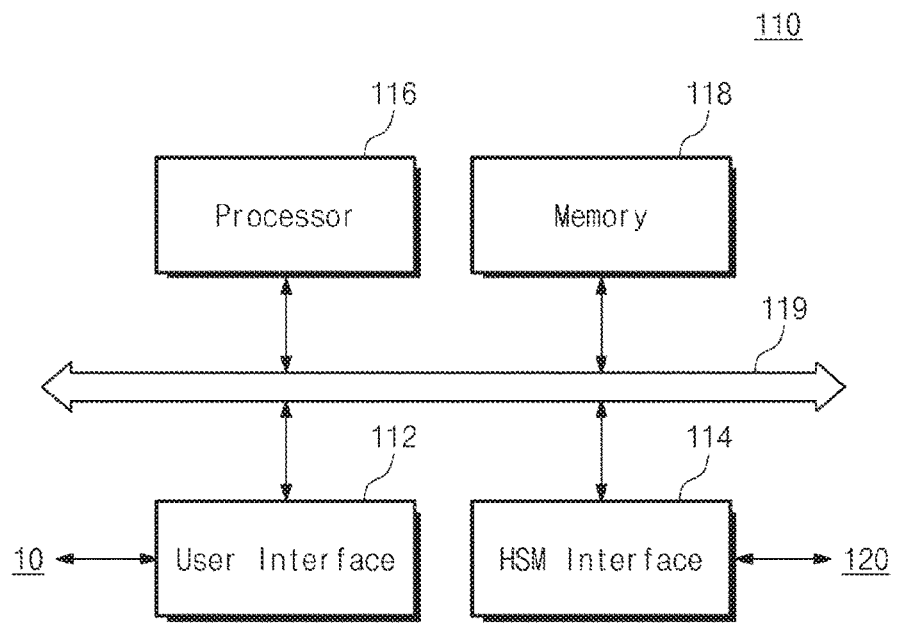
FIG. 6 is block diagram illustrating a computing system of FIG. 1 according to an exemplary embodiment of the inventive concept.

FIG. 6 is block diagram illustrating a computing system of FIG. 1. Referring to FIGS. 1 and 6, the computing system 110 may include a user interface 112, a hardware security module interface 114, a processor 116, a memory 118, and a system interconnector 119. However, the inventive concept is not limited thereto. For example, the computing systems 110a and 110b illustrated in FIGS. 2 and 3, respectively, may correspond to the computing system 110 illustrated in FIG. 6.

The computing system 110 may communicate with the user 10 through the user interface 112. The user interface 112 may receive the key request K_REQ from the user 10. The user interface 112 may send the received key request K_REQ to the hardware security module interface 114.

The user interface 112 may include user input interfaces such as a keyboard, a keypad, buttons, a touch panel, a touch screen, a touch pad, a touch ball, a camera, or a microphone. The user interface 112 may further include user output interfaces such as a liquid crystal display (LCD), an organic light-emitting diode (OLED) display device, an active matrix OLED (AMOLED) display device, a light-emitting diode (LED), a speaker, or a motor.

The computing system 110 may interface with the hardware security module 120 through the hardware security module interface 114. The hardware security module interface 114 may send the received key request K_REQ to the hardware security module 120. The hardware security module interface 114 may receive the public key PUBK, which is generated by the key request K_REQ, from the hardware security module 120. The hardware security module interface 114 may send the public key PUBK to the user interface 112.

The hardware security module interface 114 may be configured to communicate with the hardware security module 120 by using at least one of various communication technologies such as long term evolution (LTE), WiMAX, global system for mobile communication (GSM), code division multiple access (CDMA), Bluetooth, near field communication (NFC), Wi-Fi, or radio frequency identification (RFID).

The processor 116 may execute software (e.g., an application program, an operating system, or device drivers) in the computing system 110. The processor 116 may execute various OS-based application programs. In particular, the processor 116 may generate the signed firmware image S_FIMG. An operation of the processor 116 will be more fully described with reference to FIG. 7.

The memory 118 may include a nonvolatile memory. For example, the memory 118 may include one or more of various nonvolatile memories such as a phase-change random access memory (PRAM), a magneto-resistive RAM (MRAM), a resistive RAM (ReRAM), or a ferroelectric RAM (FRAM). In addition, the memory 118 may include a volatile memory such as a static RAM (SRAM), a dynamic RAM (DRAM), or a synchronous DRAM (SDRAM). The memory 118 may include information of codesigner versions. The codesigner versions stored in the memory 118 will be more fully described with reference to FIG. 7.

The system interconnector 119 is a system bus for providing an on-chip network in the computing system 110. For example, the system interconnector 119 may include a data bus, an address bus, and a control bus. The data bus may be a data transfer path. The address bus provides an address exchange path between IPs. The control bus provides a path for sending control signals between IPs. However, a configuration of the system interconnector 119 is not limited to the above description, and for example, the system interconnector 119 may further include arbitration devices for efficient management.

Figure 7:
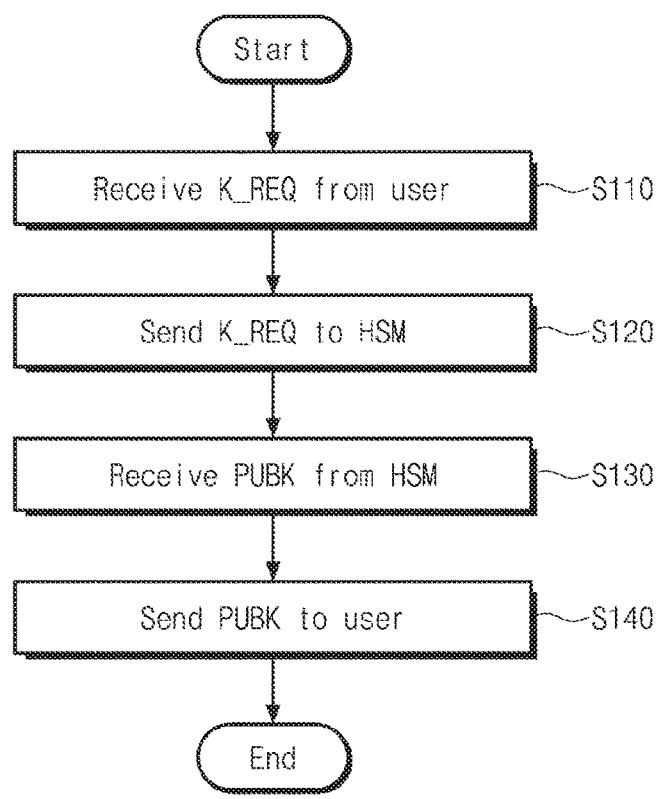
FIG. 7 is a flowchart illustrating a public key providing method of the computing system of FIG. 1 according to an exemplary embodiment of the inventive concept.

FIG. 7 is a flowchart illustrating a public key providing method of the computing system of FIG. 1 according to an exemplary embodiment of the inventive concept. Referring to FIGS. 1 and 7, in operation S110, the computing system 110 may receive the key request K_REQ from the user 10. In operation S120, the computing system 110 may send the key request K_REQ to the hardware security module 120.

In operation S130, the computing system 110 may receive the public key PUBK, which is generated based on the key request K_REQ, from the hardware security module 120. In operation S140, the computing system 110 may send the public key PUBK to the user 10. A method of generating and sending the public key PUBK will be more fully described with reference to FIG. 8.

Figure 8:
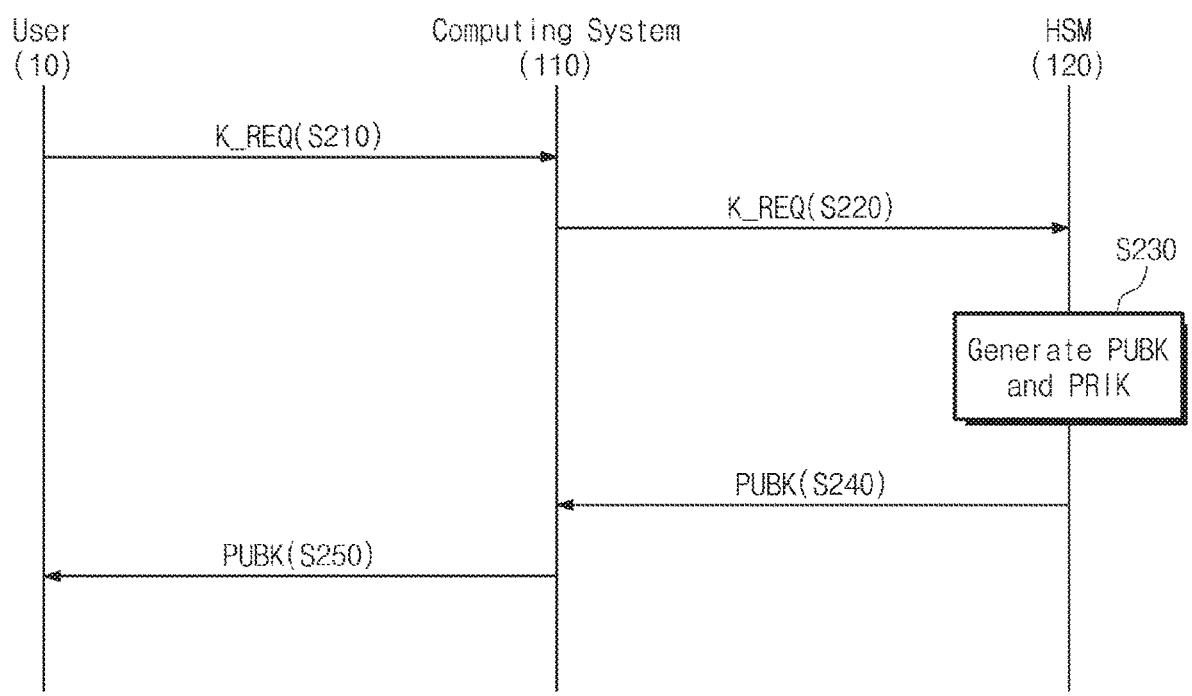
FIG. 8 is a flowchart illustrating a public key generating method of the firmware update system of FIG. 1 according to an exemplary embodiment of the inventive concept.

FIG. 8 is a flowchart illustrating a public key generating method of the firmware update system of FIG. 1 according to an exemplary embodiment of the inventive concept. Referring to FIGS. 1 and 8, in operation S210, the user 10 may transmit the key request K_REQ to the computing system 110. In operation S220, the computing system 110 may send the received key request K_REQ to the hardware security module 120.

In operation S230, the hardware security module 120 may generate the public key PUBK and the private key PRIK of the user 10 based on the key request K_REQ. In operation S240, the hardware security module 120 may store the generated public key PUBK and the generated private key PRIK in the security storage 122 and may send the public key PUBK to the computing system 110. In operation S250, the computing system 110 may transmit the public key PUBK to the user 10. The public key PUBK may be used as means for authentication in the process of generating a signature associated with a firmware image.

Figure 9:
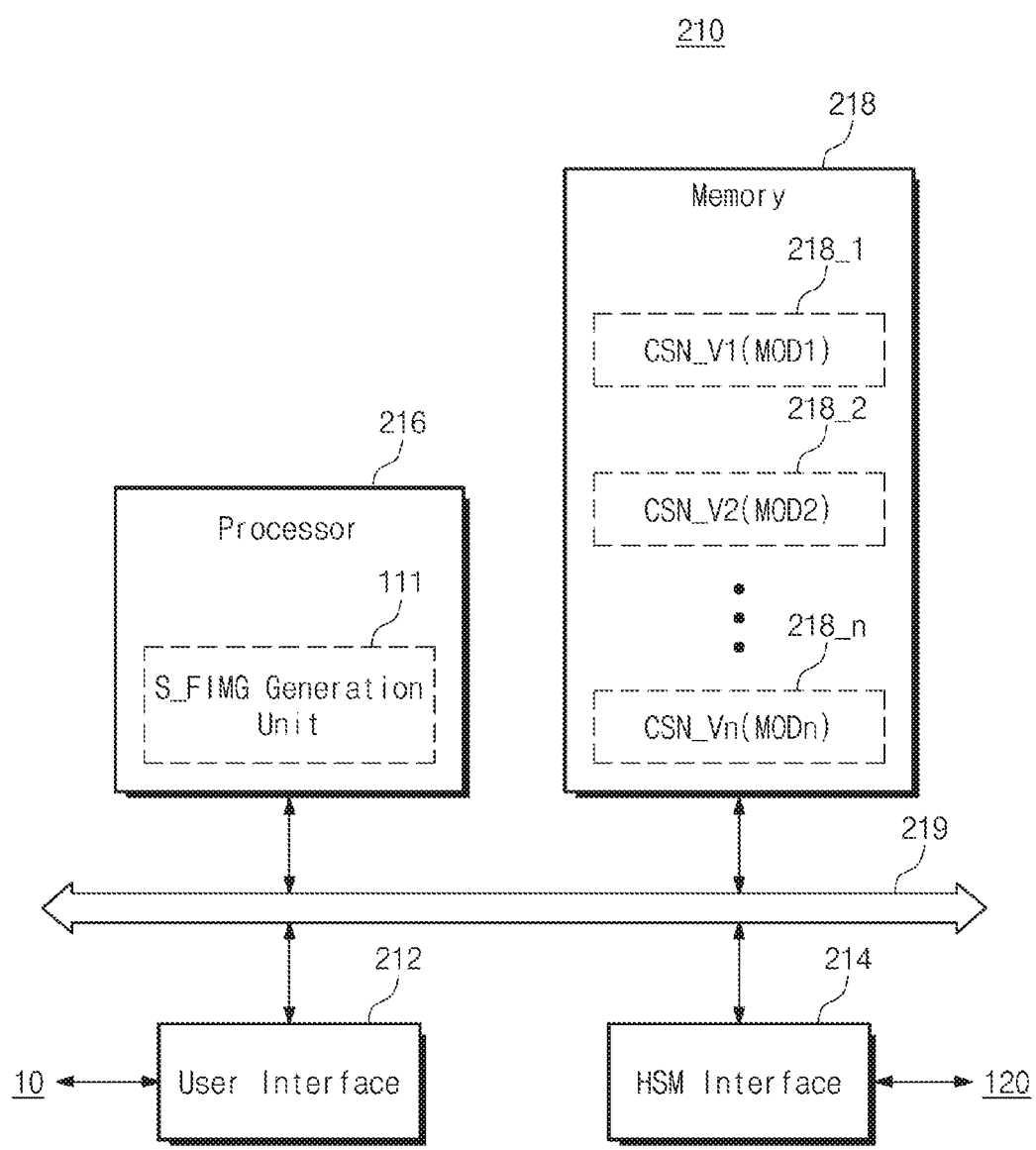
FIG. 9 is a block diagram illustrating a computing system according to an exemplary embodiment of the inventive concept.

FIG. 9 is a block diagram illustrating a computing system according to an exemplary embodiment of the inventive concept. A computing system 210 illustrated in FIG. 9 may correspond to the computing system 110 described with reference to FIGS. 4 and 6. Referring to FIGS. 4, 6, and 9, the computing system 210 may include a user interface 212, a hardware security module interface 214, a processor 216, a memory 218, and a system interconnector 219. The computing system 210 illustrated in FIG. 9 may also correspond to the computing systems 110, 110a, and 110b illustrated in FIGS. 1 to 3.

The user interface 212 may receive the model information MOD_INF and the firmware image F_IMG from the user 10. The user interface 212 may send the received model information MOD_INF and the received firmware image F_IMG to the processor 216. The user interface 212 may also send the firmware image F_IMG to the hardware security module interface 214.

The computing system 210 may interface with the hardware security module 120 through the hardware security module interface 214. The hardware security module interface 214 may send the firmware image F_IMG to the hardware security module 120. The hardware security module interface 214 may receive the signature SIG generated by the hardware security module 120. The hardware security module interface 214 may send the signature SIG to the processor 216.

The processor 216 may receive the model information MOD_INF and the firmware image F_IMG from the user interface 212 and may receive the signature SIG from the hardware security module interface 214. The processor 216 may include the signed firmware image generation unit 111 for combining the firmware image F_IMG and the signature SIG. The signed firmware image generation unit 111 may generate the signed firmware image S_FIMG by combining the firmware image F_IMG and the signature SIG.

The processor 216 may execute one of codesigner versions 218_1 to 218_n stored in the memory 218. In more detail, the processor 216 may select a codesigner version based on the model information MOD_INF. The model information MOD_INF may be product information of the electronic device 20 of FIG. 5 in which the public key PUBK is stored. In the case where the model information MOD_INF is information of a first model MOD1, the processor 216 may select a first codesigner version 218_1; in the case where the model information MOD_INF is information of a second model MOD2, the processor 216 may select a second codesigner version 218_2; in the case where the model information MOD_INF is information of an n-th model MODn, the processor 216 may select an n-th codesigner version 218_n. In other words, a version of a codesigner may be selected according to a model of the electronic device 20.

The codesigner versions 218_1 to 218_n may include different codesigner algorithms. Accordingly, the processor 216 may adjust a location and a size of the signature SIG combined with the signed firmware image S_FIMG, based on the codesigner versions 218_1 to 218_n. The processor 216 may execute a codesigner algorithm based on the selected codesigner version. For example, it is assumed here that the processor 216 selects the first codesigner version 218_1. The signed firmware image generation unit 111 of the processor 216 may generate the signed firmware image S_FIMG by execution of the first codesigner version 218_1. The processor 216 may transmit the signed firmware image S_FIMG to the user 10 through the user interface 212.

The codesigner versions 218_1 to 218_n may be stored in the memory 218. The codesigner versions 218_1 to 218_n may be selected according to the model information MOD- _INF of the electronic device 20. In other words, the same codesigner version may be selected for electronic devices of the same model.

According to an exemplary embodiment of the inventive concept, the computing system 210 may select a codesigner version based on the model information MOD_INF received together with the public key PUBK. Accordingly, the computing system 210 may drive a different codesigner algorithm for each model of the electronic device 20. Thus, security of the signed firmware image S_FIMG may be increased.

Figure 10:
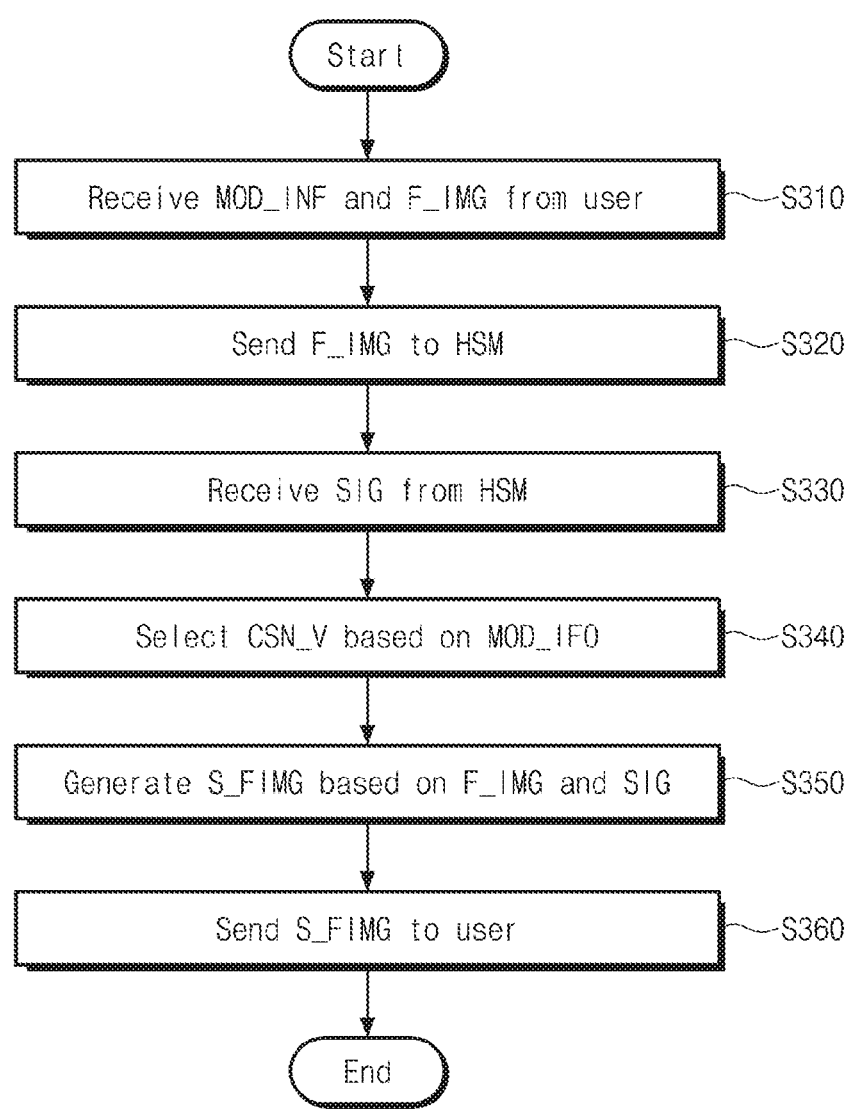
FIG. 10 is a flowchart illustrating a signed firmware image generating method of the computing system of FIG. 9 according to an exemplary embodiment of the inventive concept.

FIG. 10 is a flowchart illustrating a signed firmware image generating method of the computing system of FIG. 9 according to an exemplary embodiment of the inventive concept. Referring to FIGS. 4, 9, and 10, in operation S310, the computing system 210 may receive the model information MOD_INF and the firmware image F_IMG from the user 10. In operation S320, the computing system 210 may send the firmware image F_IMG to the hardware security module 120. In operation S330, the computing system 210 may receive the signature SIG generated in the hardware security module 120.

In operation S340, the computing system 210 may select a codesigner version CSN_V based on the model information MOD_INF. In operation S350, the computing system 210 may generate the signed firmware image S_FIMG based on the firmware image F_IMG and the signature SIG. For example, the computing system 210 may generate the signed firmware image S_FIMG by combining the firmware image F_IMG and the signature SIG based on the selected codesigner version CSN_V. In operation S360, the computing system 210 may transmit the signed firmware image S_FIMG to the user 10. A method of generating and sending the signed firmware image S_FIMG will be more fully described with reference to FIG. 11.

Figure 11:
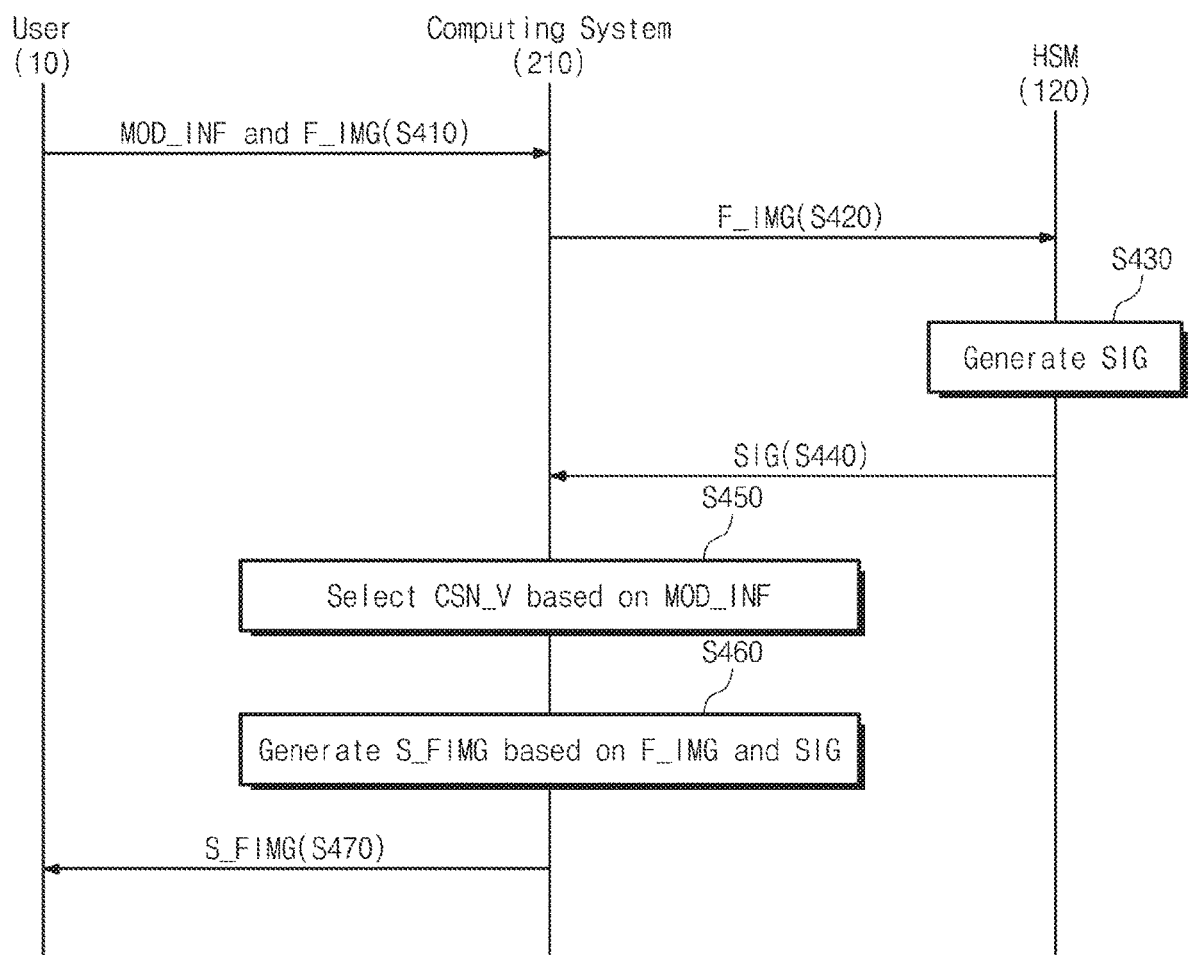
FIG. 11 is a flowchart illustrating a signed firmware image generating method of the firmware update system of FIG. 1 including the computing system of FIG. 9 according to an exemplary embodiment of the inventive concept.

FIG. 11 is a flowchart illustrating a signed firmware image generating method of the firmware update system of FIG. 1 including the computing system of FIG. 9 according to an exemplary embodiment of the inventive concept. Referring to FIGS. 5, 9, 10, and 11, in operation S410, the user 10 may transmit the model information MOD_INF and the firmware image F_IMG to the computing system 210. The model information MOD_INF may include product information of the electronic device 20, and the firmware image F_IMG may need a signature for an update in the electronic device 20.

In operation S420, the computing system 210 may send the firmware image F_IMG to the hardware security module 120. In operation S430, the hardware security module 120 may generate the signature SIG based on the firmware image F_IMG. For example, the hardware security module 120 may generate a hash value from the firmware image F_IMG. The hardware security module 120 may generate the signature SIG by combining the hash value with the private key PRIK corresponding to the public key PUBK. In operation S440, the hardware security module 120 may send the signature SIG to the computing system 210.

In operation S450, the computing system 210 may select the codesigner version CSN_V based on the model information MOD_INF. In operation S460, the computing system 210 may generate the signed firmware image S_FIMG based on the firmware image F_IMG and the signature SIG. For example, the computing system 210 may generate the signed firmware image S_FIMG by combining the firmware image F_IMG and the signature SIG based on the selected codesigner version CSN_V. In operation S470, the computing system 210 may transmit the signed firmware image S_FIMG to the user 10.

Figure 12:
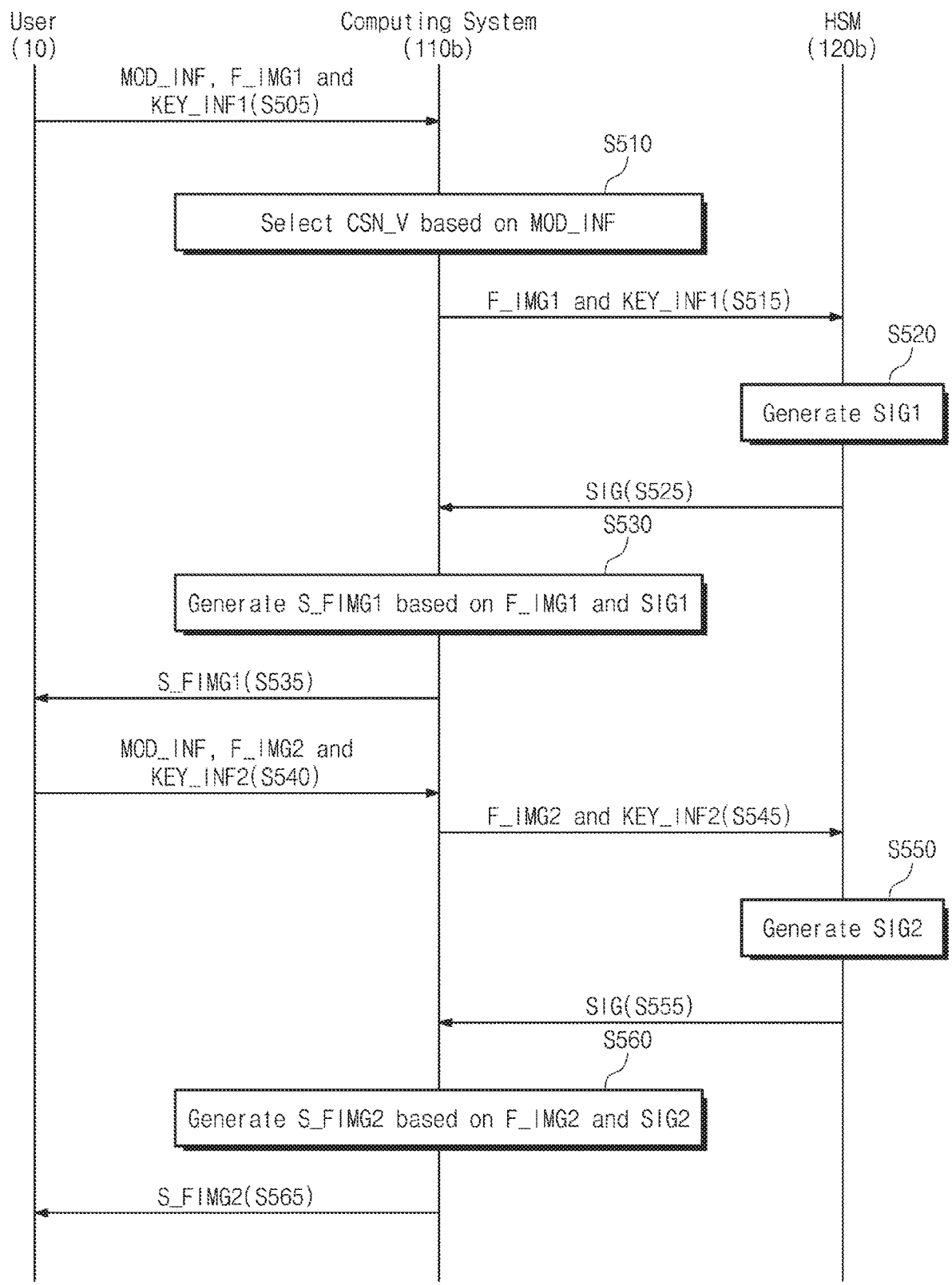
FIG. 12 is a flowchart illustrating a signed firmware image generating method of the firmware update system of FIG. 3 according to an exemplary embodiment of the inventive concept.

FIG. 12 is a flowchart illustrating a signed firmware image generating method of the firmware update system of FIG. 3 including the computing system of FIG. 9 according to an exemplary embodiment of the inventive concept. As described above, the computing system 110b described herein may correspond to the computing system 210 of FIG. 9. Referring to FIGS. 3, 9, and 12, in operation S505, the user 10 may transmit the model information MOD_INF, a first firmware image F_IMG1, and first key information KEY_INF1 to the computing system 110b. The first firmware image F_IMG1 may be a new firmware image for an update in a first electronic device. The first key information KEY_INF1 may be information of the first public key PUBK1. Referring to FIG. 3, the user 10 may be provided with the first and second public keys PUBK1 and PUBK2 from the firmware update system 100b. Therefore, the user 10 may provide the computing system 110b with information of a public key (e.g., the first public key PUBK1) included in a first electronic device in which the first firmware image F_IMG1 is updated. In operation S510, the computing system 110b may select the codesigner version CSN_V based on the model information MOD_INF.

In operation S515, the computing system 110b may send the first firmware image F_IMG1 and the first key information KEY_INF1 to the hardware security module 120b. In operation S520, the hardware security module 120b may generate the first signature SIG1 based on the first firmware image F_IMG1 and the first key information KEY_INF1. In more detail, the first signature SIG1 may be generated by combining a hash generated from the first firmware image F_IMG1 and the first private key PRIK1. In operation S525, the hardware security module 120b may send the generated first signature SIG1 to the computing system 110b.

In operation S530, the computing system 110b may generate a signed first firmware image S_FIMG1 based on the first firmware image F_IMG1 and the first signature SIG1. For example, the computing system 110b may generate the signed first firmware image S_FIMG1 by combining the first firmware image F_IMG1 and the first signature SIG1 based on the selected codesigner version CSN_V. In operation S535, the computing system 110b may transmit the signed first firmware image S_FIMG1 to the user 10.

In operation S540, the user 10 may transmit the model information MOD_INF, a second firmware image F_IMG2, and second key information KEY_INF2 to the computing system 110b. The second firmware image F_IMG2 may be a new firmware image for an update in a second electronic device. Here, the first electronic device may be different from the second electronic device. The user 10 may provide the computing system 110b with information of a public key (e.g., the second public key PUBK2) included in the second electronic device in which the second firmware image F_IMG2 is updated.

In operation S545, the computing system 110b may send the second firmware image F_IMG2 to the hardware security module 120b. In operation S550, the hardware security module 120b may generate the second signature SIG2 based on the second firmware image F_IMG2 and the second key information KEY_INF2. In more detail, the second signature SIG2 may be generated by combining a hash generated from the second firmware image F_IMG2 and the second private key PRIK2. In operation S555, the hardware security module 120b may send the generated second signature SIG2 to the computing system 110b.

In operation S560, the computing system 110b may generate a signed second firmware image S_FIMG2 based on the second firmware image F_IMG2 and the second signature SIG2. For example, the computing system 110b may generate the signed second firmware image S_FIMG2 by combining the second firmware image F_IMG2 and the second signature SIG2 based on the selected codesigner version CSN_V. In operation S565, the computing system 110b may transmit the signed second firmware image S_FIMG2 to the user 10.

If the model information MOD_INF received with the second firmware image F_IMG2 is different from the model information MOD_INF received with the first firmware image F_IMG1, the computing system 110b may select a new codesigner version CSN_V, based on the model information MOD_INF received with the second firmware image F_IMG2. Afterwards, the computing system 110b may generate the signed second firmware image S_FIMG2 by combining the second firmware image F_IMG2 and the second signature SIG2, based on the new codesigner version CSN_V.

Figure 13:
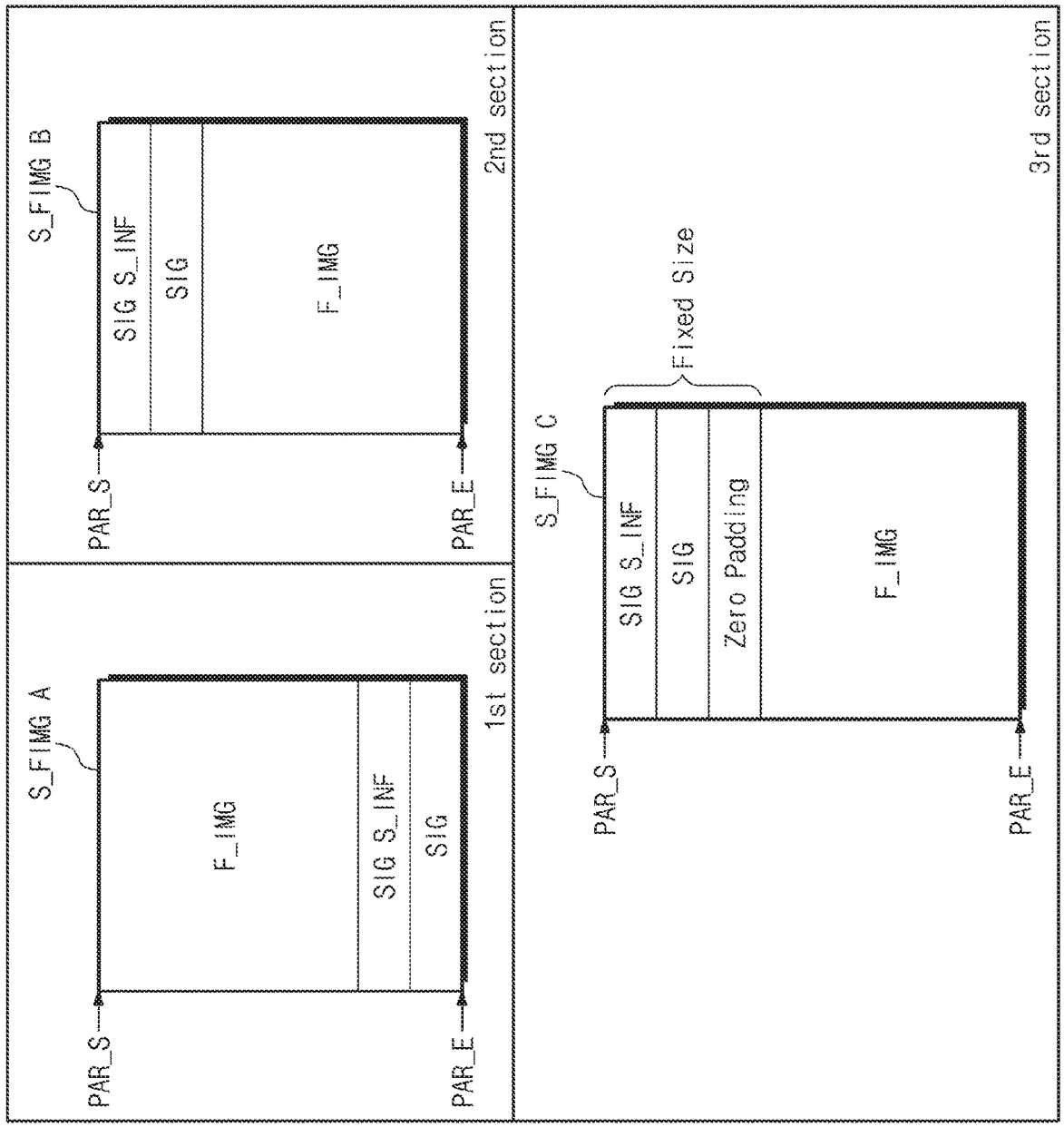
FIG. 13 is a conceptual diagram illustrating a signed firmware image generated in the computing system of FIG. 9, according to an exemplary embodiment of the inventive concept.

FIG. 13 is a conceptual diagram illustrating a signed firmware image generated in the computing system of FIG. 9, according to an exemplary embodiment of the inventive concept. Referring to FIGS. 9 and 13, the computing system 110/110a/110b/210 (hereinafter referred to as the computing system 110 for convenience of description) may generate signed firmware images S_FIMG A to S_FIMG C of various types. The signed firmware images S_FIMG A to S_FIMG C are illustrated in first to third sections, respectively, of FIG. 13.

The computing system 110 may select one of the signed firmware images S_FIMG A to S_FIMG C based on a selected codesigner version. For example, in the case where the computing system 110 selects a first codesigner version CSN_V1, the computing system 110 may combine the firmware image F_IMG and the signature SIG like the signed firmware image S_FIMG A illustrated in the first section. The signed firmware image S_FIMG A in the first section may be combined in the order of the firmware image F_IMG, size information SIG S_INF of the signature SIG, and the signature SIG. The size information SIG S_INF of the signature SIG may include information of a data size of the signature SIG. The signed firmware image S_FIMG A in the first section may be parsed in the electronic device 20 in the above-described order. For example, the electronic device 20 may start parsing from the firmware image F_IMG (hereinafter referred to as "PAR_S") and may end the parsing at the signature SIG (hereinafter referred to as "PAR_E").

For example, in the case where the computing system 110 selects a second codesigner version CSN_V2, the computing system 110 may combine the firmware image F_IMG and the signature SIG like the signed firmware image S_FIMG B in the second section. The signed firmware image S_FIMG B in the second section may be combined in the order of the signature size information SIG S_INF, the signature SIG, and the firmware image F_IMG. The signed firmware image S_FIMG B in the second section may be parsed in the electronic device 20 in this order. For example, the electronic device 20 may start parsing from the signature size information SIG S_INF (PAR_S) and may end the parsing at the firmware image F_IMG (PAR_E).

For example, in the case where the computing system 110 selects a third codesigner version CSN_V3, the computing system 110 may combine the firmware image F_IMG and the signature SIG like the signed firmware image S_FIMG C illustrated in the third section. The signed firmware image S_FIMG C in the third section may be combined in the order of the signature size information SIG S_INF, the signature SIG, zero padding, and the firmware image F_IMG. The signature size information SIG S_INF, the signature SIG, and the zero padding may have a fixed size FIX_S. For example, the fixed size FIX_S may be 256 bytes. If the signature size information SIG S_INF and the signature SIG take up 200 bytes, the remaining 56 bytes may be filled with the zero padding. However, this is only an example, and the fixed size FIX_S may be less or greater than 256 bytes.

The signed firmware image S_FIMG C in the third section may be parsed in the electronic device 20 in the above-described order. For example, the electronic device 20 may start parsing from the signature size information SIG S_INF (PAR_S) and may end the parsing at the firmware image F_IMG (PAR_E).

The signed firmware images S_FIMG A to S_FIMG C illustrated in the first to third sections, respectively, may be implemented with binary code. Three types of signed firmware images S_FIMG A to S_FIMG C are illustrated in FIG. 13. However, the inventive concept is not limited thereto. For example, the number of signed firmware images may be proportional to the number of codesigner versions (e.g., CSN_V1 to CSN_Vn in FIG. 9). Additionally, signed firmware image shapes (e.g., the combination order of elements therein) are not limited to the three kinds illustrated in FIG. 13. A signed firmware image shape may be variously modified or changed if a signature and/or a firmware image are included therein.

The computing system 110 may drive different codesigner algorithms for different models of the electronic device 20. Accordingly, security and reliability of the signed firmware image S_FIMG may be increased.

Thus, according to exemplary embodiments of the inventive concept, it may be possible to provide a computing system having high security and stability upon updating firmware and a firmware managing method thereof.

Figure 14:
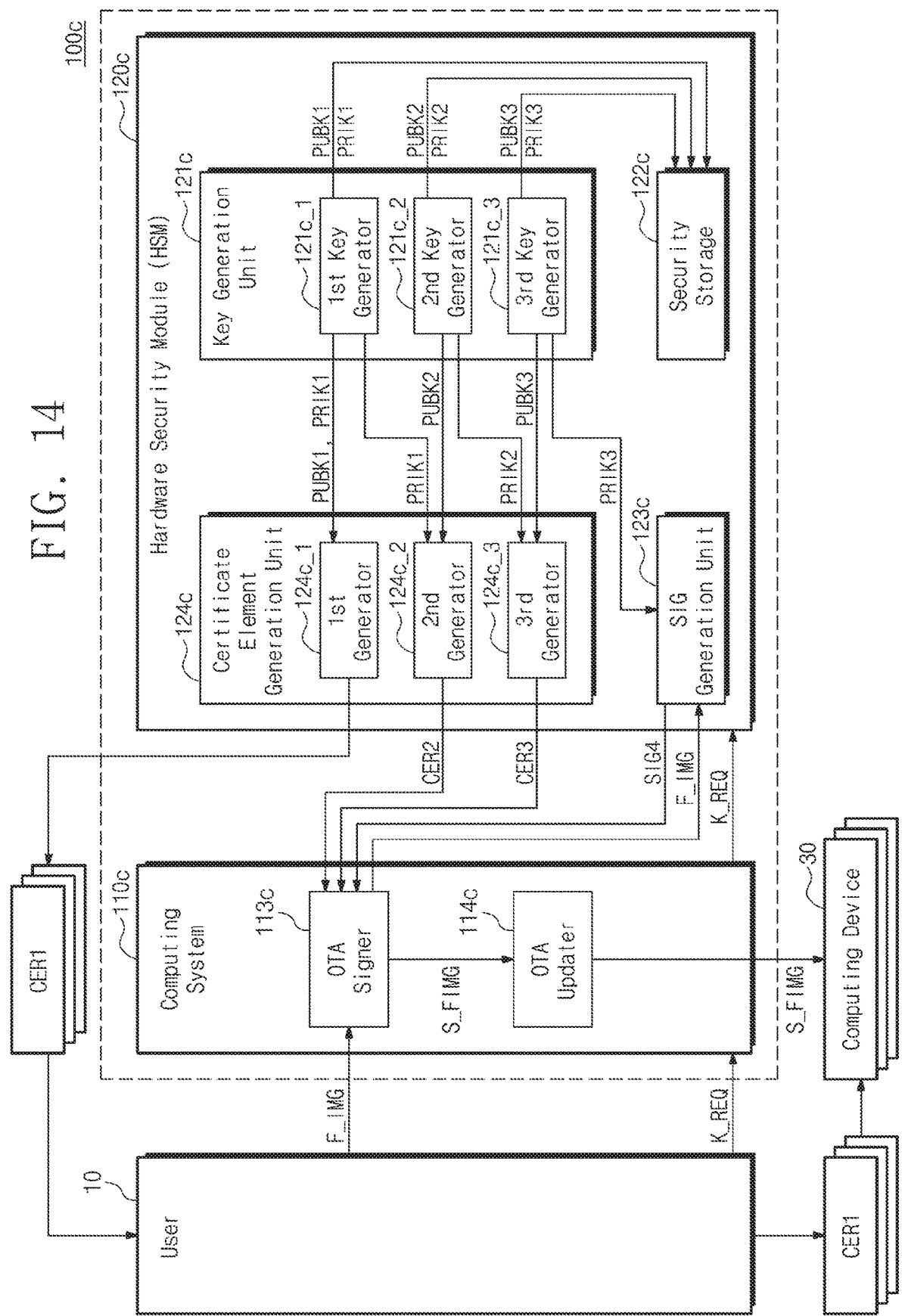
FIG. 14 is a block diagram illustrating a firmware update system to generate certificate elements according to an exemplary embodiment of the inventive concept.

FIG. 14 is a block diagram illustrating a firmware update system 100 to generate certificate elements, according to an exemplary embodiment of the inventive concept. Referring to FIG. 14, a firmware update system 100c may include a computing system 110c and a hardware security module 120c.

The user 10 may manufacture or sell computing devices 30. To generate certificate elements needed to update firmwares of the computing devices 30, the user 10 may transmit a key request K_REQ to the computing system 110c. The user 10 may transmit the firmware image F_IMG to be updated to the computing system 110c.

The user 10 may receive a first certificate element CER1 from the firmware update system 110c. For example, the first certificate element CER1 may be delivered in the form of a separate hardware device equipped with a security system. For example, the first certificate element CER1 may be delivered in the form of a semiconductor chip or a semiconductor package. The user 10 may include the first certificate element CER1 in the computing devices 30 upon manufacturing the computing devices 30.

The computing devices 30 may include the electronic device 20 described with reference to FIGS. 1 to 13. The computing devices 30 may include various mobile devices such as a smartphone, a smart pad, and a smart watch. The computing devices 30 may include various Internets of things (IoT) devices such as a refrigerator and a television, which communicate with a network.

The computing system 110c may communicate with the user 10. For example, the computing system 110c may communicate with a network terminal, which the user 10 utilizes, over a network such as Internet. The computing system 110c may receive the key request K_REQ from the user 10. The computing system 110c may send the key request K_REQ to the hardware security module 120.

The computing system 110c may include an over-the-air (OTA) signer 113c and an OTA updater 114c. The OTA signer 113c may receive the firmware image F_IMG from the user 10. The OTA signer 113c may send the firmware image F_IMG to the hardware security module 120c.

The OTA signer 113c may receive second and third certificate elements CER2 and CER3 and a fourth signature SIG4 from the hardware security module 120c. The OTA signer 113c may combine the firmware image F_IMG, the second and third certificate elements CER2 and CER3, and the fourth signature SIG4 to generate a signed firmware image S_FIMG.

The OTA signer 113c may send the signed firmware image S_FIMG to the OTA updater 114c. The OTA updater 114c may transmit the signed firmware image S_FIMG to the computing devices 30. The computing devices 30 may authenticate the signed firmware image S_FIMG by using the first certificate element CER1 included when they are manufactured.

If the authentication is successfully made, the computing devices 30 may install or execute the signed firmware image S_FIMG. For example, the OTA signer 113c and the OTA updater 114c may be included in one computing device or may be respectively included in different computing devices communicating with each other wiredly or wirelessly.

The hardware security module 120c may receive the key request K_REQ from the computing system 110c. In response to the key request K_REQ, the hardware security module 120c may generate certificate elements. The hardware security module 120c includes a key generation unit 121c, security storage 122c, a signature generation unit 123c, and a certificate element generation unit 124c.

The key generation unit 121c includes first to third key generators 121c_1 to 121c_3. The first key generator 121c_1 may generate a first public key PUBK1 and a first private key PRIK1. The second key generator 121c_2 may generate a second public key PUBK2 and a second private key PRIK2.

The third key generator 121c_3 may generate a third public key PUBK3 and a third private key PRIK3. The first to third public keys PUBK1 to PUBK3 and the first to third private keys PRIK1 to PRIK3 may be stored in the security storage 122c.

The first and second public keys PUBK1 and PUBK2 and the first and second private keys PRIK1 and PRIK2 may be sent to the certificate element generation unit 124c. The third public key PUBK3 may be sent to the certificate element generation unit 124c. The third private key PRIK3 may be sent to the signature generation unit 123c.

For example, when the key generation unit 121c generates the first to third public keys PUBK1 to PUBK3 or the first to third private keys PRIK1 to PRIK3 for the first time, the key generation unit 121c may directly send the first to third public keys PUBK1 to PUBK3 or the first to third private keys PRIK1 to PRIK3 to the certificate element generation unit 124c or the signature generation unit 123c.

For example, in the case where the key generation unit 121c already generates the first to third public keys PUBK1 to PUBK3 or the first to third private keys PRIK1 to PRIK3, the key generation unit 121c may not directly send the first to third public keys PUBK1 to PUBK3 or the first to third private keys PRIK1 to PRIK3 to the certificate element generation unit 124c or the signature generation unit 123c.

The security storage 122c may store the first to third public keys PUBK1 to PUBK3 and the first to third private keys PRIK1 to PRIK3. The security storage 122c may provide a necessary one(s) among the first to third public keys PUBK1 to PUBK3 or the first to third private keys PRIK1 to PRIK3 depending on a request of the signature generation unit 123c or the certificate element generation unit 124c.

The signature generation unit 123c may receive the third private key PRIK3 from the key generation unit 121c or the security storage 122c. The signature generation unit 123c may receive the firmware image F_IMG from the OTA signer 113c. The signature generation unit 123c may generate the fourth signature SIG4 from the firmware image F_IMG by using the third private key PRIK3. The signature generation unit 123c may transmit the fourth signature SIG4 to the OTA signer 113c.

The certificate element generation unit 124c includes first to third generators 124c_1 to 124c_3. The first generator 124c_1 may receive the first public key PUBK1 and the first private key PRIK1 from the first key generator 121c_1 or the security storage 122c.

The first generator 124c_1 may generate the first signature SIG1 (refer to FIG. 18) by using the first private key PRIK1. The first generator 124c_1 may generate the first certificate element CER1 including the first public key PUBK1 and the first signature SIG1. The first certificate element CER1 may be delivered to the user 10.

The second generator 124c_2 may receive the first private key PRIK1 from the first key generator 121c_1 or the security storage 122c. The second generator 124c_2 may receive the second public key PUBK2 from the second key generator 121c_2 or the security storage 122c.

The second generator 124c_2 may generate the second signature SIG2 (refer to FIG. 18) by using the first private key PRIK1. The second generator 124c_2 may generate the second certificate element CER2 including the second public key PUBK2 and the second signature SIG2. The second certificate element CER2 may be transmitted to the OTA signer 113c.

The third generator 124c_3 may receive the second private key PRIK2 from the second key generator 121c_2 or the security storage 122c. The third generator 124c_3 may receive the third public key PUBK3 from the third key generator 121c_3 or the security storage 122c.

The third generator 124c_3 may generate the third signature SIG3 (refer to FIG. 18) by using the second private key PRIK2. The third generator 124c_3 may generate the third certificate element CER3 including the third public key PUBK3 and the third signature SIG3. The third certificate element CER3 may be transmitted to the OTA signer 113c.

For example, the first to third certificate elements CER1 to CER3 may be stored in the security storage 122c. When the first to third certificate elements CER1 to CER3 are generated for the first time, the first to third certificate elements CER1 to CER3 may be directly sent from the certificate element generation unit 124c to the computing system 110c or the user 10.

In the case where the first to third certificate elements CER1 to CER3 are previously generated, the first to third certificate elements CER1 to CER3 may be sent from the security storage 122c to the computing system 110c or the user 10. For example, at least one or all of the first to third certificate elements CER1 to CER3 may have an expiration date.

The expiration date of the at least one all of the first to third certificate elements CER1 to CER3 may be marked by a time or a read count. If the expiration date of the at least one all of the first to third certificate elements CER1 to CER3 elapses, the at least one certificate element may not be effectively verified.

For example, the first certificate element CER1 may be a certificate authority (CA) having the authority to issue or authenticate the second certificate element CER2, for example, a root certificate authority. The second certificate element CER2 may be a certificate authority having the authority to issue or authenticate the third certificate element CER2. The third certificate element CER3 may be a certificate. For example, the third certificate element CER3 may be a code verification certificate (CVC).

Figure 15:
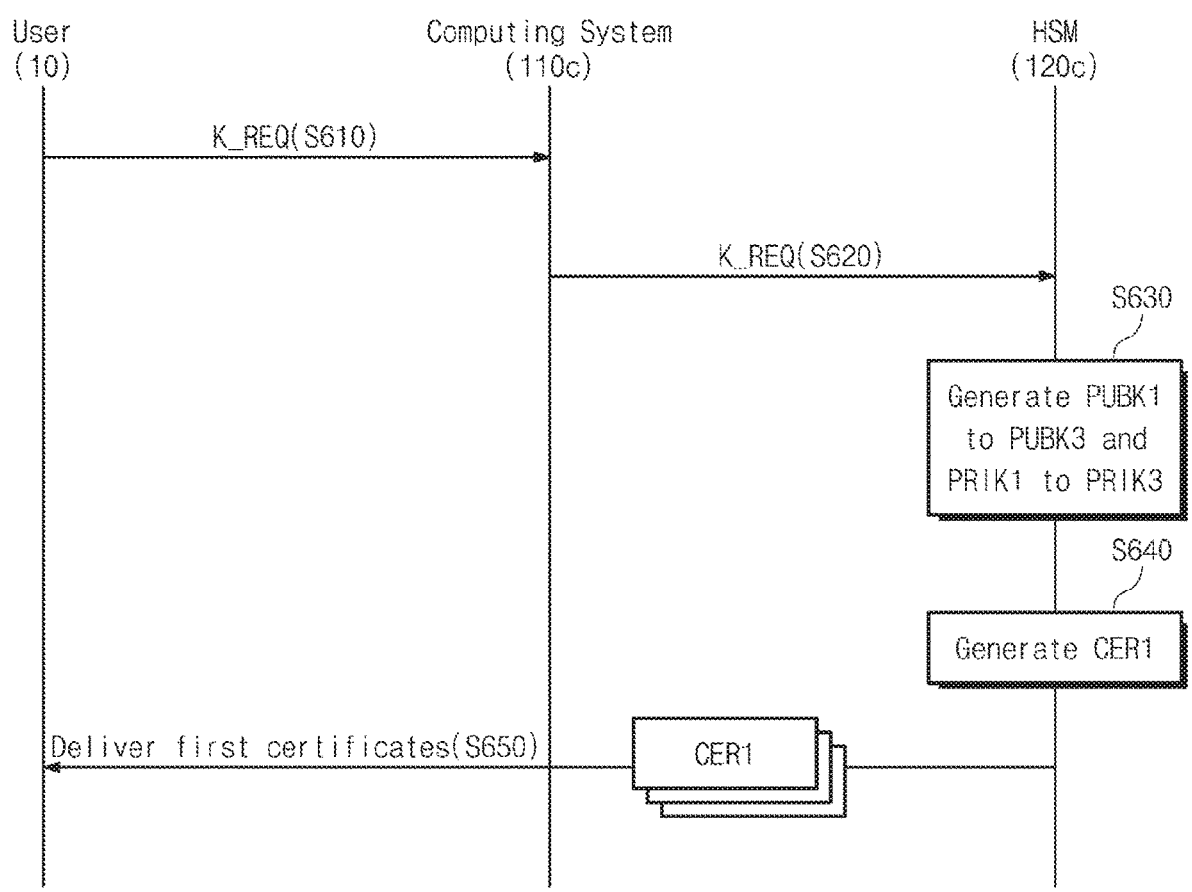
FIG. 15 is a flowchart illustrating a method of generating first to fourth certificate elements at the firmware update system.

FIG. 15 is a flowchart illustrating a method of generating the first to fourth certificate elements CER1 to CER3 at the firmware update system 110c. Referring to FIGS. 14 and 15, in operation S610, the user 10 may transmit the key request K_REQ to the computing system 110c.

In operation S620, the computing system 110c may send the key request K_REQ to the hardware security module 120c. In operation S630, the key generation unit 121c of the hardware security module 120c may generate the first to third public keys PUBK1 to PUBK3 and the first to third private keys PRIK1 to PRIK3.

The first to third public keys PUBK1 to PUBK3 and the first to third private keys PRIK1 to PRIK3 may be stored in the security storage 122c. In operation S640, the certificate element generation unit 124c of the hardware security module 110c may generate the first certificate element CER1. The first certificate element CER1 may be stored in the security storage 122c.

The first certificate element CER1 may be delivered to the user 10. For example, the first certificate element CER1 may be delivered to the user 10 in the form of hardware equipped with a security system. For example, the first certificate element CER1 may be delivered to the user 10 in the form of a semiconductor chip or a semiconductor package equipped with the security system.

The user 10 may manufacture or sell the computing devices 30 each including the first certificate element CER1. The computing devices 30 may in advance include the first certificate element CER1 and may use the first certificate element CER1 upon updating firmware. If the first certificate element CER1 is included upon manufacturing the computing devices 30, security of authentication may be further improved, and a procedure for authentication may be further simplified.

In an embodiment, the certificate element generation unit 124c of the hardware security module 120c may generate the second and third certificate elements CER2 and CER3 together upon generating the first certificate element CER1. The second and third certificate elements CER2 and CER3 thus generated may be stored in the security storage 122c.

Figure 16:
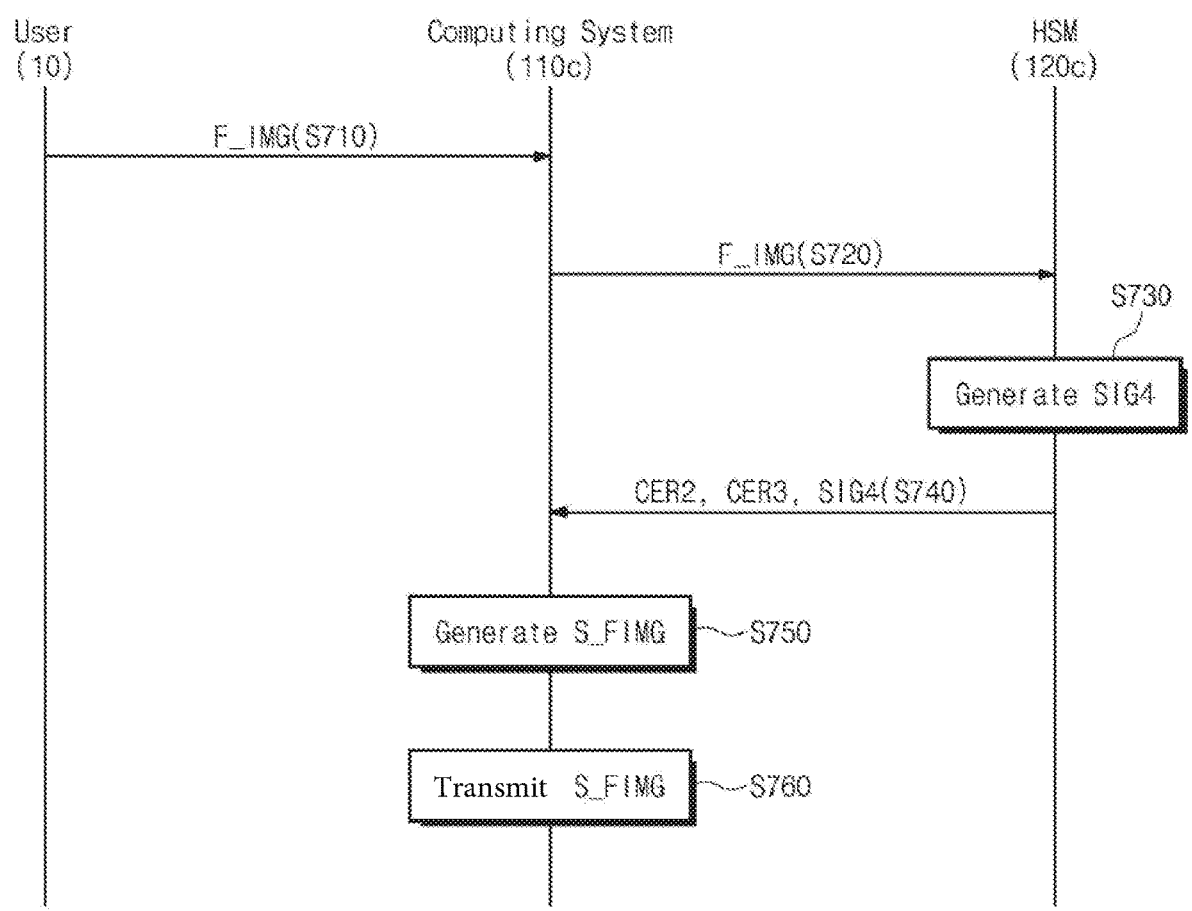
FIG. 16 is a flowchart illustrating a method of generating a signed firmware image at the firmware update system.

FIG. 16 is a flowchart illustrating a method of generating the signed firmware image S_FIMG at the firmware update system 110c. Referring to FIGS. 15 and 16, in operation S710, the user 10 may transmit the firmware image F_IMG to be updated in the computing devices 30 to the computing system 110c. For example, the user 10 may send the firmware image F_IMG to the computing system 110c together with a request of the signed firmware image S_FIMG.

In operation S720, the computing system 110c may send the firmware image F_IMG to the hardware security module 120c. For example, the computing system 110c may send the firmware image F_IMG to the hardware security module 120c together with the second and third certificate elements CER2 and CER3 and the fourth signature SIG4.

In operation S730, the certificate element generation unit 124c of the hardware security module 120c may generate the fourth certificate element SIG4. For example, the signature generation unit 123c may generate the fourth signature SIG4 from the firmware image F_IMG by using the third private key PRIK3 received from the key generation unit 121c or the security storage 122c. The hardware security module 120c may send the second and third certificate elements CER2 and CER3 and the fourth signature SIG4 to the computing system 110c.

For example, the second and third certificate elements CER2 and CER3 may be sent from the security storage 122c to the computing system 110c. As another example, the second and third certificate elements CER2 and CER3 may be generated and may be sent to the computing system 110c.

In operation S740, the OTA signer 113c of the computing system 110c may combine the firmware image F_IMG, the second and third certificate elements CER2 and CER3, and the fourth signature SIG4 to generate the signed firmware image S_FIMG. As described with reference to FIG. 14, the OTA signer 113c may variously combine the firmware image F_IMG, the second and third certificate elements CER2 and CER3, and the fourth signature SIG4 to generate the signed firmware image S_FIMG in operation S750.

In operation S760, the OTA updater 114c of the computing system 110c may transmit the signed firmware image S_FIMG to the computing devices 30. For example, the OTA updater 114c may be an update server that is provided to support updating firmwares of the computing devices 30. The computing devices 30 may download the signed firmware image S_FIMG from the OTA updater 114c.

Figure 17:
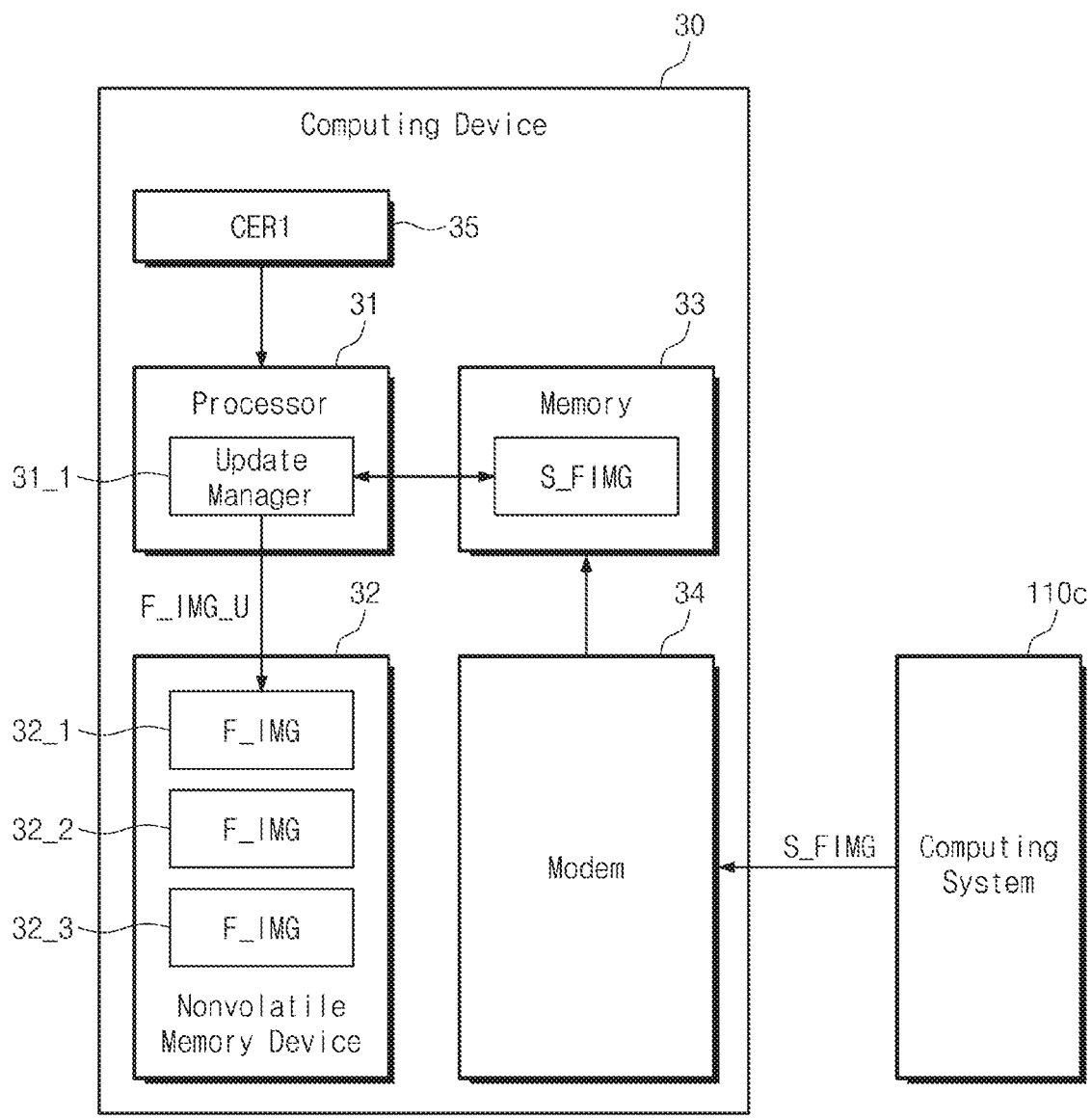
FIG. 17 is a block diagram illustrating an example of the computing device according to an exemplary embodiment of the inventive concept.

FIG. 17 is a block diagram illustrating an example of the computing device 30 according to an exemplary embodiment of the inventive concept. Referring to FIGS. 14 and 17, the computing device 30 includes a processor 31, a nonvolatile memory device 32, a memory 33, a modem 34, and hardware security storage 35. The processor 31 may drive firmware and may perform updating of the firmware.

The processor 31 may execute an update manager 31_1. The update manager 31_1 may manage or control updating of signed firmware images 32_1 to 32_3 stored in the nonvolatile memory device 32. For example, the update manager 31_1 may be a code or application driven by the processor 31.

The nonvolatile memory device 32 may include a flash memory, a phase change random access memory, a ferroelectric random access memory, a magnetic random access memory, or a resistive random access memory. The memory 33 may be a working memory or a main memory of the computing device 30. The processor 31 may load and execute codes of the first to third firmware images 32_1 to 32_3 on the memory 33. The memory 33 may include a dynamic random access memory (DRAM).

The modem 34 may communicate with an external device over a network. For example, the modem 34 may communicate with the computing system 110. The modem 34 may communicate with an external device in a wired or wireless communication manner.

The hardware security storage 35 may be storage including a security system implemented in the form of hardware. The hardware security storage 35 may store the first certificate element CER1. The hardware security storage 35 may be provided in the form of hardware (e.g., a semiconductor chip or a semiconductor package) equipped with the security system.

When there is a need to update at least one (e.g., the second firmware image 32_2) of the first to third firmware images 32_1 to 32_3, the computing device 30 may download the signed firmware image S_FIMG from the computing system 110c through the modem 34 and may store the signed firmware image S_FIMG in the memory 33 or the nonvolatile memory device 32. In an embodiment, it is assumed that the signed firmware image S_FIMG is stored in the memory 33.

The update manager 31_1 may read the first certificate element CER1 from the hardware security storage 35. The update manager 31_1 may verify the signed firmware image S_FIMG stored in the memory 33 by using the first certificate element CER1. If the verification is successfully made, the update manager 31_1 may extract a firmware image F_IMG_U for update from the signed firmware image S_FIMG stored in the memory 33 and may store the extracted firmware image F_IMG_U for update in the nonvolatile memory device 32.

For example, the firmware image F_IMG_U for update may be overwritten on the second firmware image 32_2. As another example, the firmware image F_IMG_U for update may be stored in a free storage space of the nonvolatile memory device 32 and may be used instead of the second firmware image F_IMG.

In an embodiment, an embodiment is exemplified in FIGS. 14 to 17 as the signed firmware image S_FIMG is generated and the firmware image F_IMG is updated by using the signed firmware image S_FIMG. However, the technical idea of the inventive concept may not be limited thereto.

For example, a signed operating system image or a signed application image may be generated according to the inventive concept. It may be possible to update an operating system image or an application image in the computing device 30 by using the signed operating system image or the signed application image.

Figure 18:
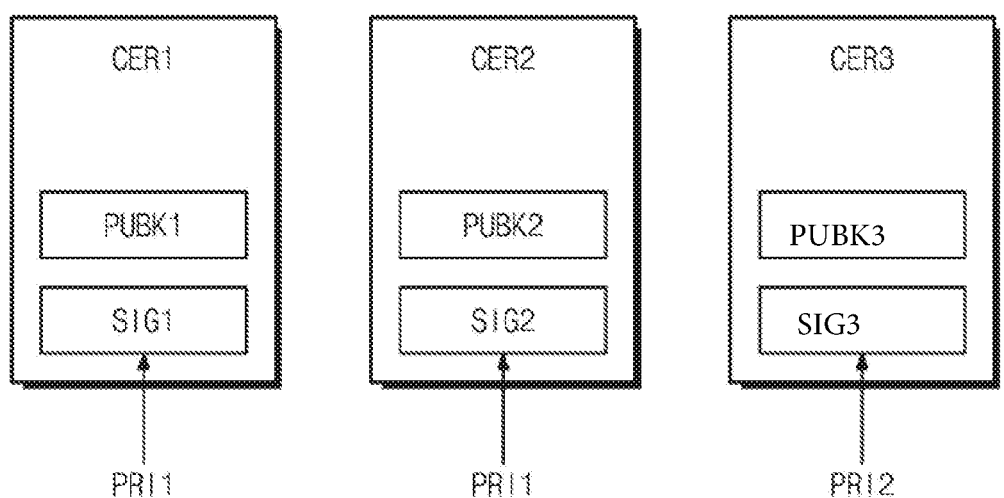
FIG. 18 is a block diagram illustrating an example of first to third certificate elements.

FIG. 18 is a block diagram illustrating an example of the first to third certificate elements CER1 to CER3. Referring to FIGS. 14 and 18, the first certificate element CER1 includes the first public key PUBK1 and the first signature SIG1. The first signature SIG1 may be generated by using the first private key PRIK1.

The second certificate element CER2 includes the second public key PUBK2 and the second signature SIG2. The second signature SIG2 may be generated by using the first private key PRIK1. The third certificate element CER3 includes the third public key PUBK3 and the third signature SIG3. The third signature SIG3 may be generated by using the second private key PRIK2.

Figure 19:
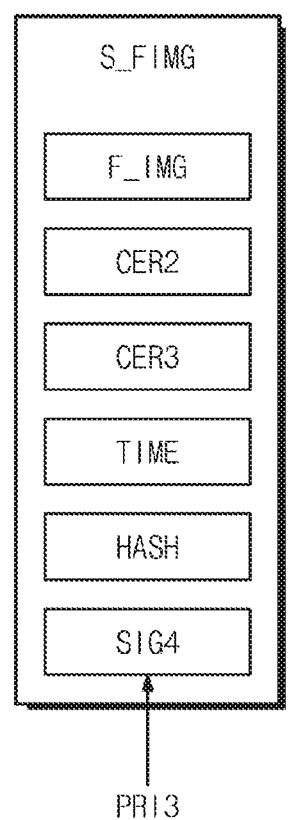
FIG. 19 is a block diagram illustrating an example of a signed firmware image.

FIG. 19 is a block diagram illustrating an example of the signed firmware image S_FIMG. Referring to FIGS. 14 and 19, the signed firmware image S_FIMG includes the firmware image F_IMG, the second certificate element CER2, the third certificate element CER3, time information TIME, hash data HASH, and the fourth signature SIG4.

The time information TIME represents a time when the fourth signature SIG4 is generated or a time when the signed firmware image S_FIMG including the fourth signature SIG4 is generated. The hash data HASH may be generated from the firmware image F_IMG. For example, the time information TIME or the hash data HASH may be generated in the hardware security module 120c or the computing system 110c.

If the time information TIME and the hash data HASH are generated in the hardware security module 120c, the time information TIME and the hash data HASH may be sent from the hardware security module 120c to the computing system 110c together with the fourth signature SIG4 (refer to operation S740 of FIG. 16).

Figure 20:
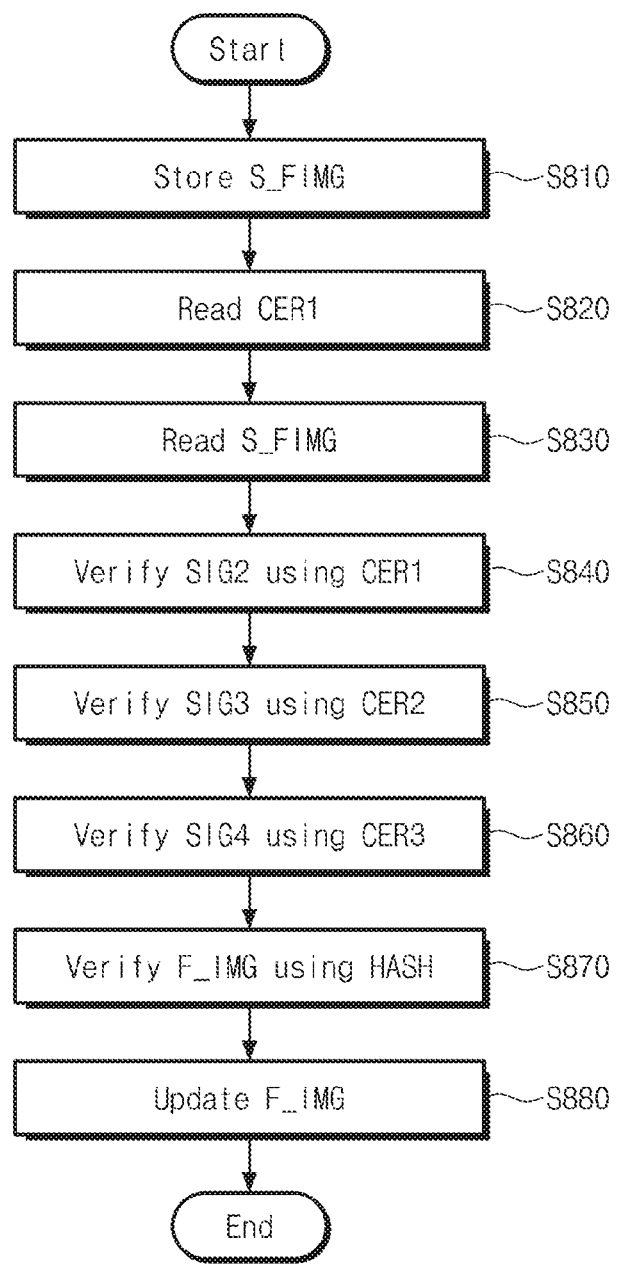
FIG. 20 is a flowchart illustrating a method in which a user executes a signed firmware image.

FIG. 20 is a flowchart illustrating a method in which the computing device 30 executes the signed firmware image S_FIMG. Referring to FIGS. 17 to 20, in operation S810, the signed firmware image S_FIMG may be stored in the memory 33 or the nonvolatile memory device 32.

For example, if the capacity of the signed firmware image S_FIMG is smaller than a free capacity of the memory 33 or is smaller than a threshold capacity, the signed firmware image S_FIMG may be stored in the memory 33. If the capacity of the signed firmware image S_FIMG is not smaller than the free capacity of the memory 33 or is not smaller than the threshold capacity, the signed firmware image S_FIMG may be stored in the nonvolatile memory device 32. In an embodiment, it is assumed that the signed firmware image S_FIMG is stored in the memory 33.

In operation S820, the update manager 31_1 of the processor 31 may read the first certificate element CER1 from the hardware security storage 35. In operation S830, the update manager 31_1 may read the signed firmware image S_FIMG from the memory 33 or the nonvolatile memory device 32. The update manager 31_1 may verify the signed firmware image S_FIMG by using the first certificate element CER1.

For example, in operation S840, the update manager 31_1 may verify the second signature SIG2 of the second certificate element CER2 of the signed firmware image S_FIMG, by using the first public key PUBK1 included in the first certificate element CER1. Since the second signature SIG2 is generated by using the first private key PRIK1, the second signature SIG2 may be authenticated by using the first public key PUBK1. If the verification fails, an update operation using the signed firmware image S_FIMG may be stopped.

If the second signature SIG2 is successfully verified, operation S850 is performed. In operation S850, the update manager 31_1 may verify the third signature SIG3 of the third certificate element CER3 of the signed firmware image S_FIMG, by using the second public keys PUBK2 included in the second certificate element CER2 of the signed firmware image S_FIMG. Since the third generator SIG3 is generated by using the second private key PRIK2, the third signature SIG3 may be authenticated by using the third public key PUBK3. If the verification fails, an update operation using the signed firmware image S_FIMG may be stopped.

If the third signature SIG3 is successfully verified, operation S860 is performed. In operation S860, the update manager 31_1 may verify the fourth signature SIG4 of the signed firmware image S_FIMG, by using the third public keys PUBK3 included in the third certificate element CER3 of the signed firmware image S_FIMG. Since the fourth generator SIG4 is generated by using the third private key PRIK3, the third signature SIG4 may be authenticated by using the third public key PUBK3. If the verification fails, an update operation using the signed firmware image S_FIMG may be stopped.

If the verification is successfully made, operation S870 is performed. In operation S870, the update manager 31_1 may verify the firmware image F_IMG of the signed firmware image S_FIMG, by using the hash data HASH of the signed firmware image S_FIMG. If the verification fails, an update operation using the signed firmware image S_FIMG may be stopped. If the verification is successfully made, operation S880 is performed.

In operation S880, the update manager 31_1 may update the second firmware image 32_2 stored in the nonvolatile memory device 32 by using the firmware image F_IMG included in the signed firmware image S_FIMG. For example, the firmware image F_IMG of the signed firmware image S_FIMG may be overwritten on the second firmware image 32_2 or may be used instead of the second firmware image 32_2.

In the case where the signed firmware image S_FIMG is stored in the memory 33, the firmware image F_IMG of the signed firmware image S_FIMG may be written in the nonvolatile memory device 32. In the case where the signed firmware image S_FIMG is stored in not the memory 33 but the nonvolatile memory device 32, the remaining data or information of the signed firmware image S_FIMG other than the firmware image F_IMG may be invalidated or deleted.

As described above, according to an exemplary embodiment of the inventive concept, the firmware image F_IMG is verified with multiple steps. Accordingly, the security of the firmware image F_IMG may be further improved. The firmware image F_IMG may be verified by using the first certificate element CER1 included in advance in the user 10. Accordingly, the security of verification is improved, and verification is performed more easily.

While the inventive concept has been described with reference to exemplary embodiments thereof, it will be apparent to those of ordinary skill in the art that various changes and modifications may be made thereto without departing from the spirit and scope of the inventive concept as set forth in the following claims.

What is claimed is:

1. A computing system comprising:
a processor configured to select a first code-signer version among a plurality of code-signer versions corresponding to a respective first model among a plurality of different models using model information of an electronic device, to receive a signature, which is generated using a firmware image, from an external hardware security module, to generate a signed firmware image by combining the received signature and the firmware image using the selected first code-signer version, and to output the signed firmware image to the electronic device for installation as a firmware update; and
a memory configured to store the plurality of code-signer versions.

2. The computing system of claim 1, further comprising:
a first interface configured to receive the model information of the electronic device and the firmware image.

3. The computing system of claim 1, further comprising:
a second interface configured to send the firmware image to the external hardware security module and to receive the signature from the external hardware security module.

4. The computing system of claim 1, further comprising:
a first interface configured to receive a key request; and
a second interface configured to send the key request to the external hardware security module.

5. The computing system of claim 4, wherein a public key and a private key are generated using the key request,
wherein the public key is received through the second interface, and
wherein the public key is output through the first interface.

6. The computing system of claim 5, wherein the public key is stored in the electronic device.

7. The computing system of claim 1, wherein the plurality of code-signer versions include different code-signer algorithms, and
wherein the processor combines the firmware image and the signature, using a first code-signer algorithm included in the selected first code-signer version.

8. The computing system of claim 1, wherein the firmware image is a first firmware image, the signature is a first signature, and the signed firmware image is a signed first firmware image,
wherein the processor receives a second firmware image, which is different from the first firmware image, and the model information,
wherein the processor receives a second signature, which is generated using the second firmware image, from the external hardware security module,
wherein the processor generates a signed second firmware image by combining the second signature and the second firmware image using the selected first code-signer version, and
wherein the first signature is different from the second signature.

9. The computing system of claim 1, wherein the firmware image, the signature, the signed firmware image, the electronic device, and the model information correspond to a first firmware image, a first signature, a first signed firmware image, a first electronic device, and first model information, respectively, and
wherein the processor receives a second firmware image different from the first firmware image and second model information of a second electronic device, and selects a second code-signer version among the plurality of code-signer versions using the second firmware image.

10. The computing system of claim 9, wherein the processor receives a second signature, which is generated using the second firmware image, from the external hardware security module and generates a signed second firmware image by combining the second signature and the second firmware image using the second code-signer version.

11. A firmware update system comprising:
a computing system comprising a memory and a processor including a signed firmware generation unit; and
a hardware security module comprising a signature generation unit and a security storage,
wherein the computing system is configured to receive a first firmware image from a user of a first electronic device and transmit the first firmware image to the signature generation unit,
wherein the signature generation unit is configured to read a first private key of the first firmware image from the security storage, generate a first hash value from the first firmware image, generate a first signature using the first hash value and the first private key, and transmit the first signature to the signed firmware generation unit, and
wherein the signed firmware generation unit is configured to receive the first signature, receive first model information of the first electronic device from the user, select a first code-signer version from a plurality of code-signer versions corresponding to a respective first model among a plurality of different models stored in the memory using the first model information, combine the first firmware image and the first signature using the selected first code-signer version to generate a first signed firmware image, and transmit the first signed firmware image to the user for installation to the first electronic device as a firmware update.

12. The firmware update system of claim 11, wherein the computing system is further configured to receive a first key request from the user and transmit the first key request to a key generation unit in the hardware security module, and wherein the key generation unit generates a first public key and the first private key using the first key request, stores the first public key and the first private key in the security storage, and transmits the first public key to the computing system.

13. The firmware update system of claim 12, wherein the first public key is stored in a first boot loader of the first electronic device and the first signed firmware image is stored in a second boot loader of the first electronic device.

14. The firmware update system of claim 11, wherein the computing system is further configured to receive a second firmware image and second model information of a second electronic device, wherein the signature generation unit is further configured to generate a second signature using the second firmware image and transmit the second signature, wherein the signed firmware generation unit is further configured to select a second code-signer version from the plurality of code-signer versions using the second model information and combine the second firmware image and the second signature using the second code-signer version to generate a second signed firmware image, and wherein if the first model information and the second model information are the same, the first code-signer version and the second code-signer version are the same.

15. The firmware update system of claim 11, wherein the first firmware image, the first signature, size information of the first signature, and zero padding are combined to form the first signed firmware image, and wherein the first signature, the size information, and the zero padding together have a fixed size.

16. An electronic device comprising:
storage configured to store a first certificate element;
a modem configured to receive over a network at least one signed firmware image including at least one executable firmware image;
a nonvolatile memory device configured to store the at least one executable firmware image; and
a processor configured to execute the at least one executable firmware image,
wherein the at least one signed firmware image further includes a second certificate element, a third certificate element, and a signature,
wherein the processor verifies the second certificate element by using a first public key included in the first certificate element, verifies the third certificate element by using a second public key included in the second certificate element if the verification of the second certificate element is successful, and verifies the signature by using a third public key included in the third certificate element if the verification of the third certificate element is successful,
wherein the processor executes the executable firmware image as a firmware update if the verification of the signature is successful.

17. The electronic device of claim 16, wherein the first certificate element is a root certificate authority (CA), the second certificate element is a certificate authority (CA), and the third certificate element is a code verification certificate (CVC) of a first code-signer version among a plurality of code-signer versions corresponding to a respective plurality of different electronic device models.

18. The electronic device of claim 16, wherein the at least one signed firmware image further includes hash data, and
wherein the processor verifies the at least one executable firmware image by using the hash data if the verification of the signature is successful and executes the at least one executable firmware image if the verification of the at least one executable firmware image is successful.

19. The electronic device of claim 16, wherein the storage includes a separate hardware device equipped with a security system.

20. The electronic device of claim 16, wherein the at least one signed firmware image further includes time information representing at least one of a time when the signature is generated or a time when the signed firmware image including the signature is generated.

* * * * *